United States Patent
Caplan et al.

(10) Patent No.: US 8,503,889 B2
(45) Date of Patent: Aug. 6, 2013

(54) FILTER-BASED DPSK RECEIVER

(75) Inventors: David O. Caplan, Westford, MA (US);
Mark L. Stevens, Pepperell, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 904 days.

(21) Appl. No.: 12/532,560

(22) PCT Filed: Mar. 24, 2008

(86) PCT No.: PCT/US2008/003844
§ 371 (c)(1),
(2), (4) Date: Oct. 22, 2009

(87) PCT Pub. No.: WO2008/118411
PCT Pub. Date: Oct. 2, 2008

(65) Prior Publication Data
US 2010/0111540 A1    May 6, 2010

Related U.S. Application Data

(60) Provisional application No. 60/919,724, filed on Mar. 23, 2007.

(51) Int. Cl.
*H04B 10/06* (2006.01)
*H04B 10/12* (2006.01)
*H04J 14/02* (2006.01)

(52) U.S. Cl.
USPC .............................. 398/202; 398/87; 398/149

(58) Field of Classification Search
USPC ............... 398/82, 83, 87, 149, 202, 204, 207, 398/212, 213
See application file for complete search history.

(56) References Cited

U.S. PATENT DOCUMENTS

| | | | | |
|---|---|---|---|---|
| 6,614,950 B2 * | 9/2003 | Huang et al. | ..................... | 385/15 |
| 7,311,262 B2 * | 12/2007 | Hosoi et al. | ............. | 235/462.25 |
| 7,414,728 B2 * | 8/2008 | Caplan | .......................... | 356/477 |
| 7,650,081 B2 * | 1/2010 | Jennen et al. | ................. | 398/186 |
| 7,808,715 B2 * | 10/2010 | Hsieh | ............................ | 359/634 |
| 7,844,189 B2 * | 11/2010 | Park et al. | ...................... | 398/202 |
| 7,907,648 B2 * | 3/2011 | Matsui et al. | ................... | 372/26 |
| 2004/0081470 A1 * | 4/2004 | Griffin | ........................... | 398/188 |
| 2005/0002676 A1 * | 1/2005 | Zitelli | ........................... | 398/188 |
| 2005/0013615 A1 * | 1/2005 | Matsuda | ......................... | 398/83 |
| 2005/0100338 A1 * | 5/2005 | Yeon et al. | ..................... | 398/78 |
| 2007/0002934 A1 * | 1/2007 | Schilling | ....................... | 375/145 |

FOREIGN PATENT DOCUMENTS

| | | |
|---|---|---|
| EP | 0 719 003 | 6/1996 |
| EP | 719003 A2 * | 6/1996 |

OTHER PUBLICATIONS

International Search Report for PCT/US08/03844, mailed on Aug. 8, 2008.
International Preliminary Report on Patentability for PCT/US2008/003844, issued Sep. 29, 2009, with Written Option, mailed on Aug. 8, 2008.

* cited by examiner

*Primary Examiner* — Dalzid Singh
(74) *Attorney, Agent, or Firm* — Hamilton, Brook, Smith & Reynolds, P.C.

(57) ABSTRACT

A filter-based method of demodulating differentially encoded phase shift keyed (DPSK) optical signals, such as commonly used binary-DPSK (DBDPSK) and quadrature DPSK (DQPSK) signals, that can achieve optimal receiver sensitivity is described. This approach, which combines filtering and differential phase comparison, can reduce the complexity and cost of DPSK receivers by obviating delay-line interferometer-based demodulation. This can improve receiver stability and reduce size, weight, and power, while maintaining the ability to achieve optimal communications performance.

40 Claims, 15 Drawing Sheets

FILTER-BASED DPSK RECEIVER

RELATED APPLICATION

This application is the U.S. National Stage of International Application No. PCT/US2008/003844, filed Mar. 24, 2008, which designates the U.S., published in English, and claims the benefit of U.S. Provisional Application No. 60/919,724, filed Mar. 23, 2007. The entire teachings of the above applications are incorporated by reference.

BACKGROUND

Binary optical differential-phase-shift-keying (DBPSK) modulation has received considerable attention by the free-space optical (FSO) communications community and the telecommunications ("telecom") industry. The increased attention is due to DBPSK's increased sensitivity over commonly used on-off-keying and reduced peak power which mitigates nonlinear effects. DBPSK's utility has been established with many long-haul fiber-optic experiments demonstrating multiple Tbit/s over ~10,000 km fiber spans with hundreds of WDM-DBPSK channels (λs).

Another related modulation format, differential-quadrature-phase-shift-keying (DQPSK) modulation, has also attracted significant interest in the telecom industry due to its improved spectral efficiency, which reduces the impact of dispersion on fiber-optic links. Conventional DBPSK and DQPSK demodulators utilize delay-line interferometers (DIs) to perform demodulation.

It should be noted that while DPSK is often used to refer to binary-DPSK or DBPSK, the term used herein refers primarily to generic differentially encoded phase shift keyed modulation which includes DBPSK, differential-quadrature-phase-shift-keying (DQPSK), and M-ary-differential-phase-shift-keying (M-DPSK), in which the modulated information is typically encoded in the relative phase difference between consecutive optical pulses. Thus, demodulation of DPSK optical signals requires a differential phase comparison, which we refer to herein as differential demodulation.

FIG. 1A shows a typical DBPSK delay-line interferometer (DI) based demodulator 101 used in an optically preamplified receiver 100 for a single channel. In operation, a received DPSK signal 103 is first amplified via an optical amplifier 105. The amplified signal is then demodulated with use of the DBPSK demodulator 101. The amplified signal may first pass through a bandpass filter 107 and is thereafter converted to an intensity-keyed signal via a delay line interferometer (DI) 109, which may be driven by control electronics 111. The time-domain transfer function of the filter 107 is given by its impulse response h(t) which corresponds to the frequency response H(f).

Within the DI 109, the amplified signal may be split into two beams (not shown) of approximately equal intensity on two paths (not shown). One of the two beams is delayed in time by an optical path difference that introduces a relative time delay (τ) typically corresponding to one bit ($\tau_{bit}$). The beams in the two paths may thereafter be coherently recombined to interfere with each other either constructively or destructively depending on the relative phase difference, so that the recombined signal is directed to one of two output arms a or b.

The power in the a and b output arms of the DI 109, $P_a$ and $P_b$, respectively, is converted to a difference photocurrent $i_{sig}$ via balanced detection 113. Note that the balanced detection operation can be performed using a balanced photo-detector pair 115 as shown in FIG. 1A. Alternatively, the difference photocurrent conversion may be performed using individual photo-detectors followed by differential electronics.

DQPSK can be demodulated in a similar manner as shown in FIG. 1B, with addition of a splitter 116 that breaks the optical signal into two approximately equal portions so that the in-phase (I) and quadrature (Q) components of the DQPSK signal may be demodulated separately with two similar DIs 109i and 109q, respectively. Typically the DIs are offset biased at ±π/4 in order to simplify the detection electronics and logical mapping 130 needed to convert the demodulated optical signal to data.

FIG. 2 illustrates a detailed view of the delay-line interferometer 109, as illustrated in FIG. 1A, implemented using a Mach-Zehnder interferometer. Alternatively, DIs can be constructed with other designs such as a Michelson interferometer geometry to achieve the same transfer function and ability to demodulate DPSK signals. The Mach-Zehnder DI 109 typically has two input ports 110 and 203 and two output ports a and b. An optical signal enters one of the two input ports, e.g., the primary input 110. The secondary or spare input port 203 is not typically used, but may be used to couple in a pilot tone that may be used to assist in stabilizing the interferometer. Input coupler 205 of the DI 109 splits the incoming optical signal into two, preferably equal-power signals onto paths 202 and 204. The optical lengths of the two arms 202 and 204 may be unequal, resulting in a relative time delay that is typically about one bit period (or the symbol period for M>2) as noted above. Regardless of the interferometer type, the relative delay τ between the arms causes the present optical signal s(t) to interfere with a delayed signal s(t−τ). Depending on the relative phase of the differentially encoded data, if the interferometer is biased appropriately, the two signals constructively interfere after recombining at coupler 207, directing all of the output power to one of the two output ports a or b, thus performing the differential phase comparison needed for demodulation. Simple thresholding circuitry may subsequently be used to convert the difference signal into logical data.

SUMMARY

The benefits of optical DPSK come at the cost of increased complexity relative to On-Off Keying (OOK). In the transmitter (TX), a phase modulator and differential pre-coding may be required. In conventional high-sensitivity DBPSK receivers (RXs), an optical filter, DI demodulator and balanced detection are required in order to achieve the full sensitivity benefits of DPSK, as illustrated in FIG. 1A. For conventional DQPSK RXs, an optical filter, two DIs and balanced detection pairs are typically used as illustrated in FIG. 1B.

The DI is a technically challenging element to construct and stabilize, making it a relatively expensive part of the RX. For good performance, the arms of the DI may be required to be stable to a small fraction of a wavelength, requiring careful thermo-mechanical packaging and/or stabilization techniques, adding to the size, weight, power, and cost of the DI system.

FIG. 3 illustrates a typical method for implementing multiple channel WDM-DBPSK reception including optical filters 304(1)-304(N), delay-line interferometers (and associated controls) 307(1)-307(N), and associated detection and processing electronics 309(1)-309(N) and 311(1)-311(N), respectively, for each channel. The conventional multi-channel DPSK receiver 300 is configured to receive a multi-wavelength signal 301 to be amplified via a shared, low noise, optical amplifier 303. While the amplifier 303 may be shared, the receiver 300 requires individual filters (e.g., a WDM array 305), interferometers with control electronics 307(1)-307(N), detection electronics 309(1)-309(N), and post processing electronics 311(1)-311(N) for each wavelength channel (1)-(N).

Some large channel-count WDM-DBPSK prior art systems may distribute the DI cost and complexity by using a single DI to demodulate all channels; however, this solution does not provide as much benefit for low-channel count systems, such as the system illustrated in FIG. 1A. The use of suboptimal narrow-band optical filtering has been previously considered as a means for demodulating DBPSK, and similar duobinary signals over dispersive channels. While simple and dispersion tolerant, these single-filter DBPSK-RX approaches may incur significant sensitivity penalties in excess of 3 dB when compared to the optimum matched-filter receiver. Moreover, such single-filter approaches are only matched to one of the two DBPSK signals, and accordingly, do not generate orthogonal output signals, which is desirable from a sensitivity perspective. Rather, the single-filter approaches generate an intensity modulated output like that of OOK, which, in addition to the 3 dB sensitivity penalty, also requires an adaptive decision threshold that is dependent on the received optical power in order to avoid additional performance penalties.

In example embodiments, a new filter-based apparatus, and corresponding method, for demodulating DBPSK and DQPSK signals, which eliminates the need for the delay-line interferometer and maintains the ability to achieve optimal matched-filter performance is provided. This may be achieved by replacing the conventional delay-line interferometer-based demodulator and separate optical filtering with a filter-based demodulator that combines both filtering and differential demodulation functions and can achieve the same optimal performance. This combined approach may improve stability, reduce complexity and lead to a significant reduction in size, weight, and power (SWAP) and overall cost of communications systems employing these modulation formats.

Generally, demodulating binary differentially phase modulated signals is provided. The apparatus may include a first filter configured to perform differential demodulation and filtering of a first DPSK encoded symbol, and a second filter configured to perform differential demodulation and filtering of a second DPSK encoded symbol. The impulse response of the filters may be designed to match the incoming DPSK modulated optical signals.

The first and second filters or plurality of second filters may be grating-based such as a fiber Bragg grating (FBG), volume Bragg grating (VBG), diffraction grating (DG), and arrayed waveguide gratings (AWG) filters tuned to align to the incoming wavelength. The first filter may be configured to pass the first portion of the optical signal in which consecutive pulses are substantially in phase (e.g., a relative phase difference of 0° and reject the first portion of the optical signal in which consecutive pulses that are substantially out of phase (e.g., a relative phase difference of 180° or $\pi$ radians). Conversely, the second filter may be configured to pass the second portion of the optical signal in which consecutive pulses are substantially out of phase and reject the second portion of the optical signal in which consecutive pulses that are substantially in phase. With the first and second filters substantially matched to one of the two orthogonal DBPSK symbols, they are also substantially orthogonal with respect to each other.

In another embodiment, the apparatus, and corresponding method is extended to demodulate M-ary differentially phase modulated signals is provided. The apparatus may include M filters, each of which may be configured to perform differential demodulation and filtering of a one of the M-DPSK encoded symbols. The differential encoded phases may be evenly distributed so that the relative phase difference $\Delta\phi_{i,i+1}$ between the $i^{th}$ and the $(i+1)^{th}$ neighboring symbols is $2\pi/M$. For example, if M=2, $\Delta\phi=\pi$; if M=4, $\Delta\phi=\pi/2$; if M=8, $\Delta\phi=\pi/4$ and so on. The relative phase difference encoded in the $i^{th}$ symbol may be $\Delta\phi_i=\phi_o+i2\pi/M$, where i is an integer from 1 to M, and $\phi_o$ is an offset phase ranging from 0 to $2\pi$, inclusive. The $i^{th}$ filter may be configured to perform differential demodulation and filtering of the $i^{th}$ DPSK encoded symbol with corresponding phase difference $\Delta\phi_i$ passing symbols with differential phase=$\Delta\phi_i$ and rejecting symbols with differential phase$\neq\Delta\phi_i$. The impulse response of the filters may be designed to match the incoming M-DPSK modulated optical signals (both amplitude and phase). The filters may be similarly implemented with grating-type filters described above or other filter types with similar characteristics.

In an example embodiment, an apparatus, and corresponding method, for demodulating a differentially encoded phase modulated signal is presented. The apparatus may include a first filter that may be configured to perform differential demodulation and filtering of a first portion of the modulated signal to produce a first output. The apparatus may also include a second filter that may be configured to perform differential demodulation and filtering of a second portion of the modulated signal to produce a second output, the first and second outputs representing at least two differential phase encoded symbols of a symbol set available to be interpreted into data. The symbol set may be a multidimensional alphabet that may include symbols based on differentially encoded phase, color, wave shape, or any combination thereof.

The first and second filters may be grating based. The first and second filters may be configured to be tuned to a phase of interest. The first and second filters may also be dynamically tuned. Furthermore, the first and second filters may include a plurality of filters that may produce respective outputs, and the apparatus may further including a detector that may be configured to detect the outputs in a selectable manner. Impulse responses of the first and second filters may be matched to the differentially encoded phase modulated symbols.

The plurality of filters may include a set of M filters in which each may be configured to pass one of the differentially encoded phase modulated signals from a symbol set with a relative phase difference of approximately 360i/M degrees, where integer i=1 to M.

The apparatus may also include a controller that may be configured to cause the detector to detect outputs from an M-ary differential phase shift keying demodulation (M-DPSK) of at least a subset of M filters, based on the symbol set, where M is a positive integer.

In the case that the filters are grating based, the first filter may be configured to pass the first portion of the differentially encoded phase modulated signal with a relative phase difference of approximately 0 degrees. The second filter may be configured to pass the second portion of the differentially encoded phase modulated signal with a relative phase difference of approximately 180 degrees The first filter may further comprise multiple signal paths, a splitter that may be configured to supply a differential delay between at least two signal paths, and a combiner that may be configured to combine modulated signals on the at least one optical path with at least one other optical path.

The second filter may further comprise multiple signal paths, a splitter that may be configured to supply a differential delay between modulated signals on at least two signal paths, and a combiner that may be configured to combine the at least one signal path with at least one other signal path, wherein the at least one signal path and the at least one other signal path, cause a predetermined degree phase difference between an optical signal directed onto each at least one path.

In the case that the first and second filters are arrayed waveguide gratings (AWGs), the first filter may further comprise a splitting region that may be configured to split the first portion of the modulated signal into a first plurality of modulated signals, multiple signal paths, each optical path may be configured to supply a respective delay to each of the signals of the first plurality of modulated signals, and a demultiplexing region that may be configured to interfere and demultiplex the first plurality of modulated signals.

The second filter may further comprise a splitting region that may be configured to split the second portion of the modulated signal into a second plurality of modulated signals, multiple signal paths, each optical path may be configured to supply a respective delay to each of the signals of the second plurality of modulated signals, and a demultiplexing region that may be configured to interfere and demultiplex the second plurality of modulated signals.

In example embodiments, an apparatus, and corresponding method, for demodulating a differentially encoded phase modulated signal is presented. The apparatus may include a first filter that may be configured to perform, simultaneously, differential demodulation, filtering, and demultiplexing of a first portion of the modulated signal to produce a first output; and at least one second filter that may be configured to perform, simultaneously, differential demodulation, filtering, and demultiplexing of at least one second portion of the modulated signal to produce at least one second output, the first and at least one second outputs representing at least two phase encoded symbols of a symbol set available to be interpreted into data.

In other example embodiments, an apparatus, and corresponding method, for demodulating a differentially encoded phase modulated signals, is presented. The apparatus may include a plurality of arrayed waveguide grating (AWG) based filters, each filter may be configured to perform differential demodulation, filtering, and wavelength demultiplexing of a respective portion of the modulated signal to produce respective outputs, a controller that may be configured to select at least a subset of M filters, and a detector that may be configured to read respective outputs of the M filters to provide at least two phase encoded symbols based on a M-ary differential phase shift keying, where M is a positive integer.

An optical demodulator is also presented. The optical demodulator may include at least one first differentially decoding filter, and at least one second differentially decoding filter, the at least one first and second filters may be configured to decode at least two phase encoded symbols. The first and second filters may be further configured to decode symbols of at least one color.

An optical communications system is also presented. The optical communications system may include an N wavelength M-DPSK transmitter and receiver each may be selectably configurable to accommodate a symbol set including symbols up to M symbols.

A variable rate communications systems is also presented. The system may include an N wavelength M-DPSK transmitter and receiver that may be dynamically configurable to communicate using at least a subset of a number of wavelength channels or a differentially encoded symbol set to accommodate channel conditions and/or bandwidth demand.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating example embodiments.

DETAILED DESCRIPTION

A description of example embodiments follows.

Figure 2:
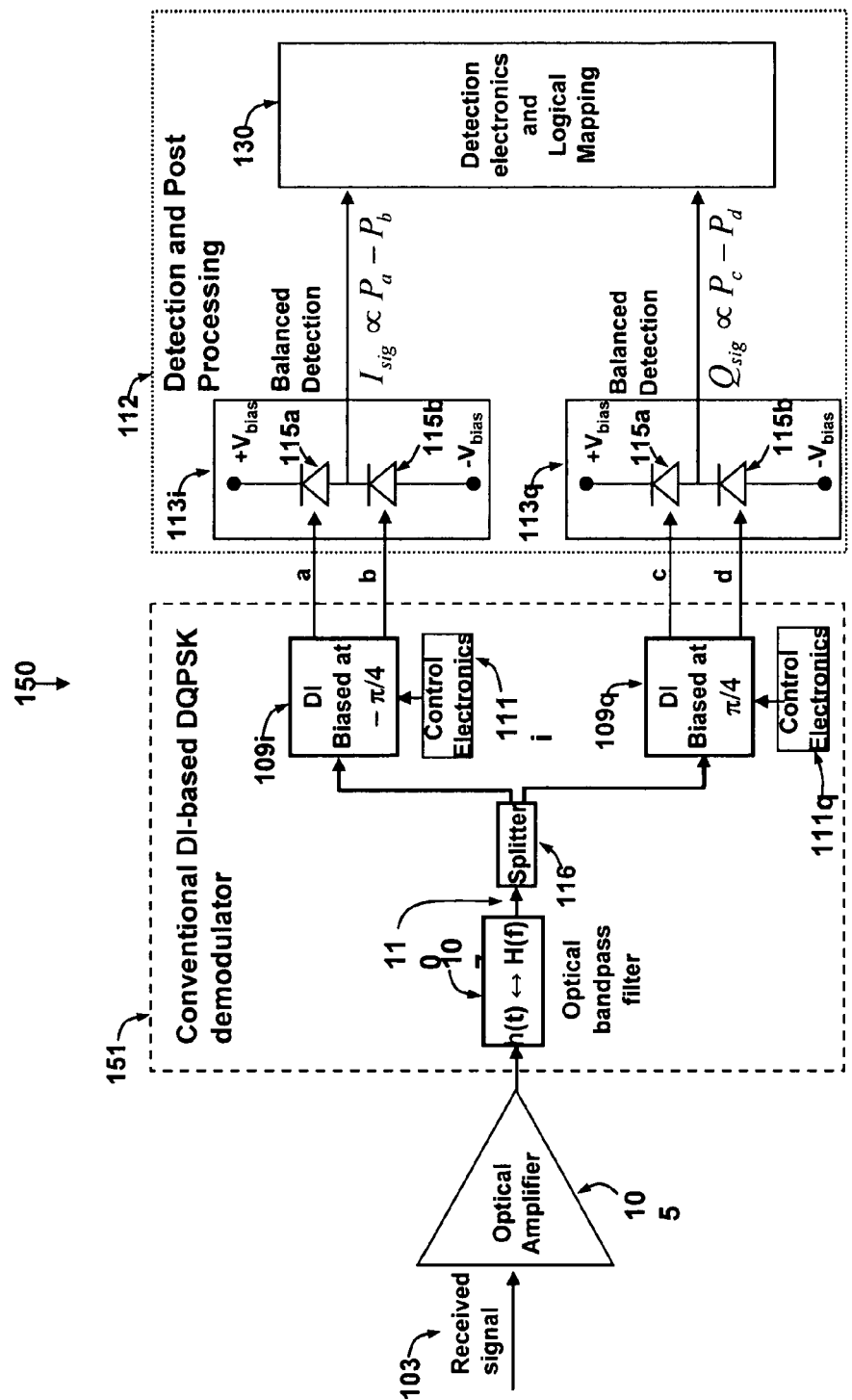
FIG. 2 is a schematic of a delay-line interferometer implemented with a Mach-Zehnder interferometer geometry according to the prior art.
Figure 3:
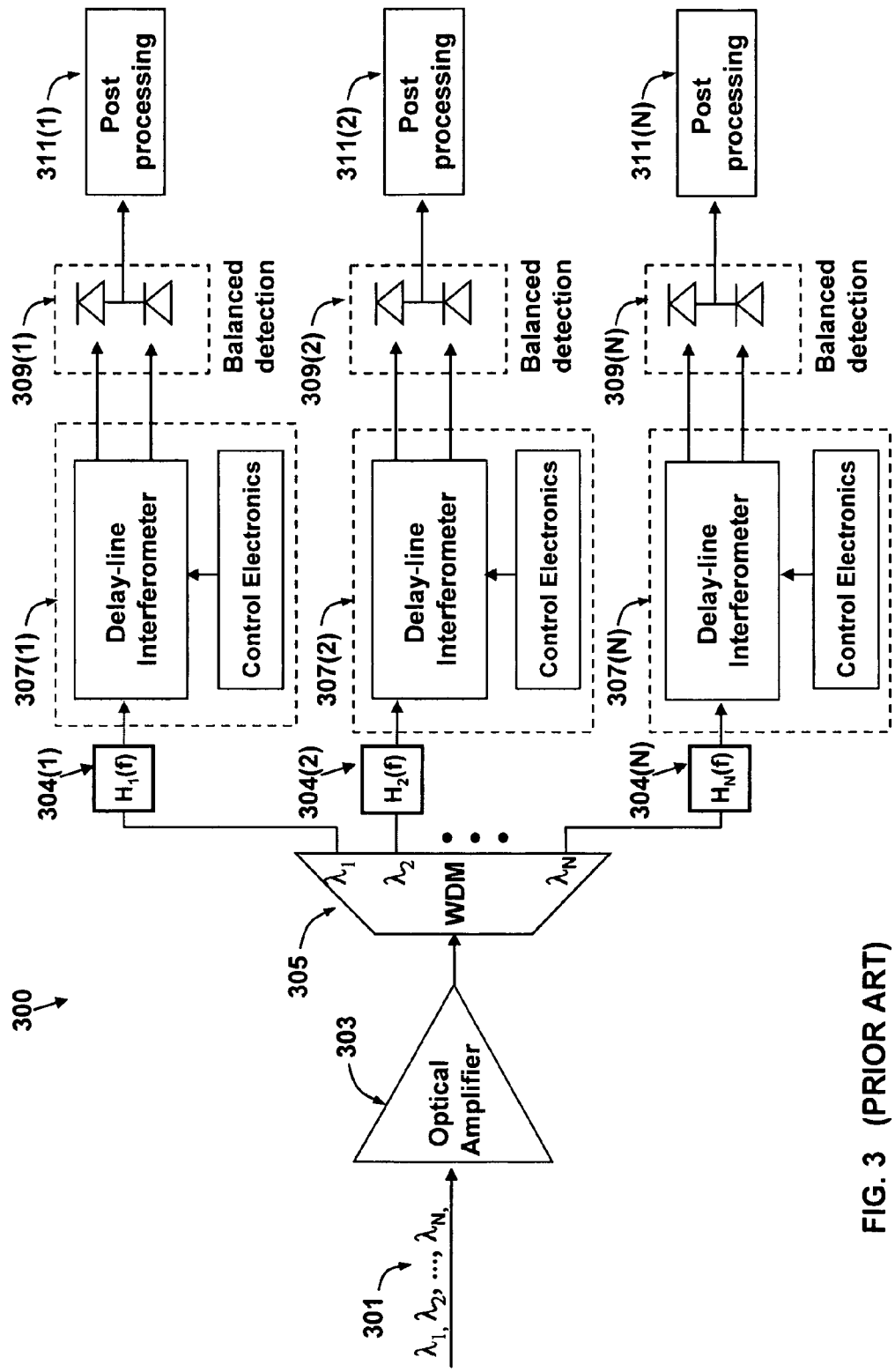
FIG. 3 is a depiction of a conventional multi-channel DPSK receiver according to the prior art.

A filter-based method of demodulating optical Differential-Phase-Shift Keying (DPSK) signals such as binary optical differential-phase-shift keying (DBPSK) and Differential Quadrature Phase Shift Keying (DQPSK) that may achieve optimal receiver sensitivity is disclosed. By combining filtering and differential phase comparison, typical Delay-line Interferometer (DI) based DPSK receivers (e.g., the DI systems illustrated in FIGS. 1-3) may be replaced with a filter-based receiver that may achieve optimal communications performance without the need for a separate DI. This may reduce DPSK receiver complexity and cost.

Note that the description below uses DBPSK demodulation as an example, but the general principles may be applied to DQPSK and other differentially encoded phase shift keyed waveforms such as M-DPSK (where M is a positive integer) as well. In DBPSK (2-DPSK), DQPSK (4-DPSK), and generically M-DPSK, for example, the differentially encoded phase differences are typically integer multiples of $2\pi/2$, $2\pi/4$, and $2\pi/M$ respectively. In general, however, the differential phase modulation can be predetermined to an arbitrary value.

Figure 1A:
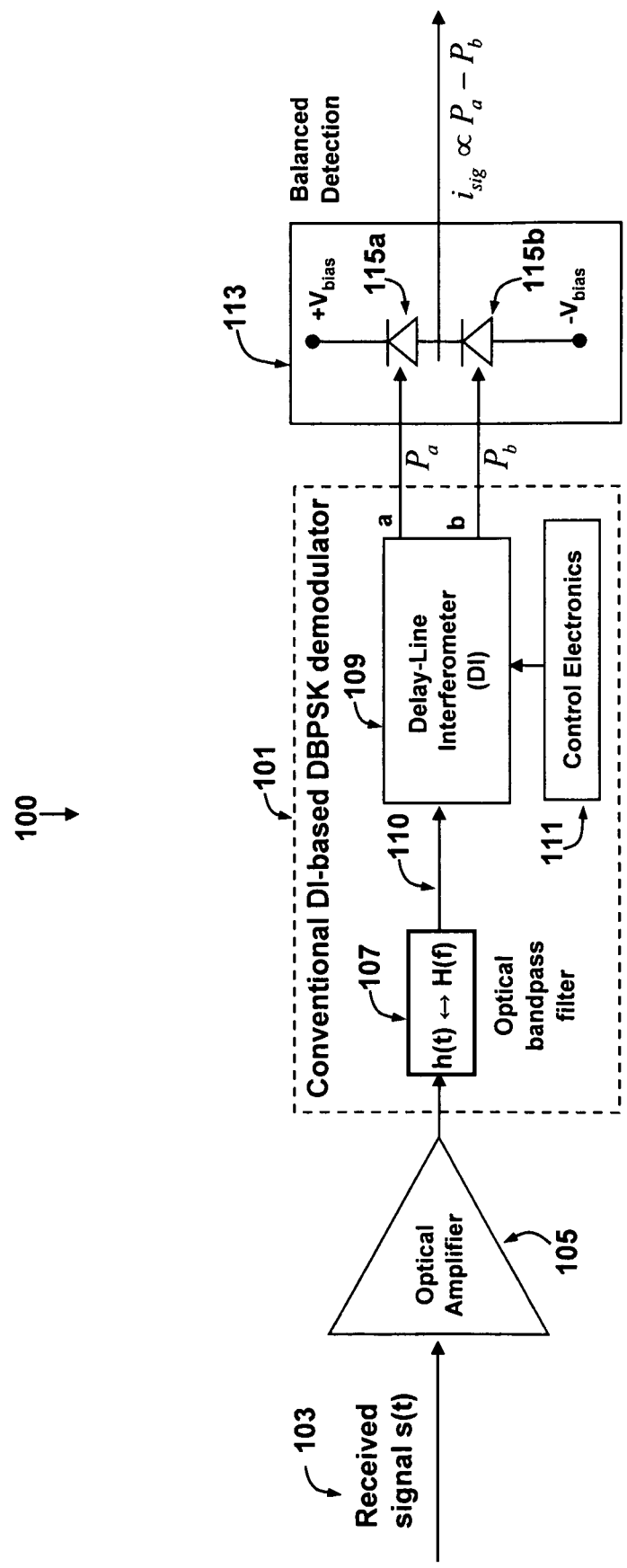
FIG. 1A is a schematic of a binary optical differential-phase-shift-keying (DBPSK) preamplified receiver according to the prior art.
Figure 1B:
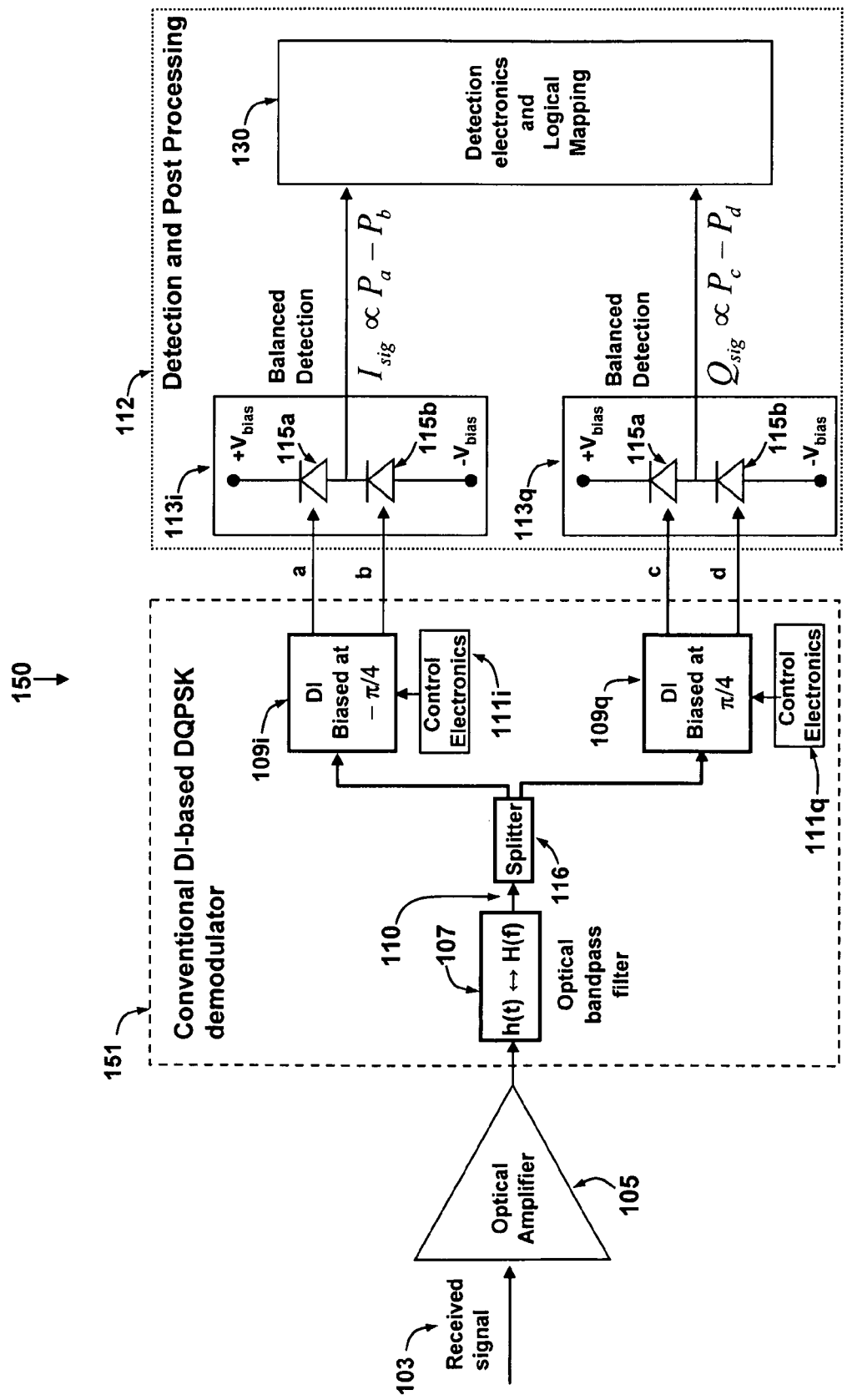
FIG. 1B is a schematic of a quadrature optical differential-phase-shift-keying (DQPSK) preamplified receiver according to the prior art.

The conventional DBPSK receiver incorporating a DI-based demodulator shown in FIG. 1A may achieve optimum, quantum-limited receiver performance when the optical filter impulse response $h_{filt}(t)$ is matched to the received signal waveform s(t). This may occur when:

$$h_{filt}(t)=s(-t) \leftrightarrow H_{filt}(f)=S^*(f) \quad (1)$$

For ease of illustration, it is convenient to assume real and symmetric signaling waveforms (such as Gaussian or Square pulsed waveforms), since with the assumption of symmetric signaling waveforms Eq. (1) reduces to:

$$h_{filt}(t)=s(t) \leftrightarrow H_{filt}(f)=S(f) \quad (2)$$

However the following analysis and conclusions may also apply to complex and asymmetric signaling waveforms without loss of generality, by substituting the relations in Eq. (1) as needed. The transfer function of the ideal delay-line interferometer may be given by:

$$h_{DI-a}(t)=\frac{1}{2}[\delta(t+\tau/2)+\delta(t-\tau/2)] \leftrightarrow |H_a(f)|^2=\cos^2(\pi f\tau), \quad (3)$$

$$h_{DI-b}(t)=\frac{1}{2}[\delta(t+\tau/2)-\delta(t-\tau/2)] \leftrightarrow |H_b(f)|^2=\sin^2(\pi f\tau), \quad (4)$$

where a and b refer to the two output arms of the DI, and δ( ) is the Dirac delta function. Utilizing Eqs. (1)-(4), the net transfer function for the a and b inputs to the balanced detection become:

$$a(t)=h_{filt}(t)*h_{DI-a}(t)=\frac{1}{2}[h_{filt}(t+\tau/2)+h_{filt}(t-\tau/2)] \leftrightarrow |A(f)|^2=|H_{filt}(f)|^2\cos^2(\pi f\tau) \quad (5)$$

$$b(t)=h_{filt}(t)*h_{DI-b}(t)=\frac{1}{2}[h_{filt}(t+\tau/2)-h_{filt}(t-\tau/2)] \leftrightarrow |A(f)|^2=|H_{filt}(f)|^2\sin^2(\pi f\tau) \quad (6)$$

where * denotes the convolution operation, and $h_{filt}(t)$ is preferably matched to the input signal s(t) in order to achieve optimal performance. Thus, Eqs. (5) and (6) represent transfer functions that include the narrowband-filtered DI-filter responses and may be used to both filter and demodulate DBPSK signals.

Figure 4A:
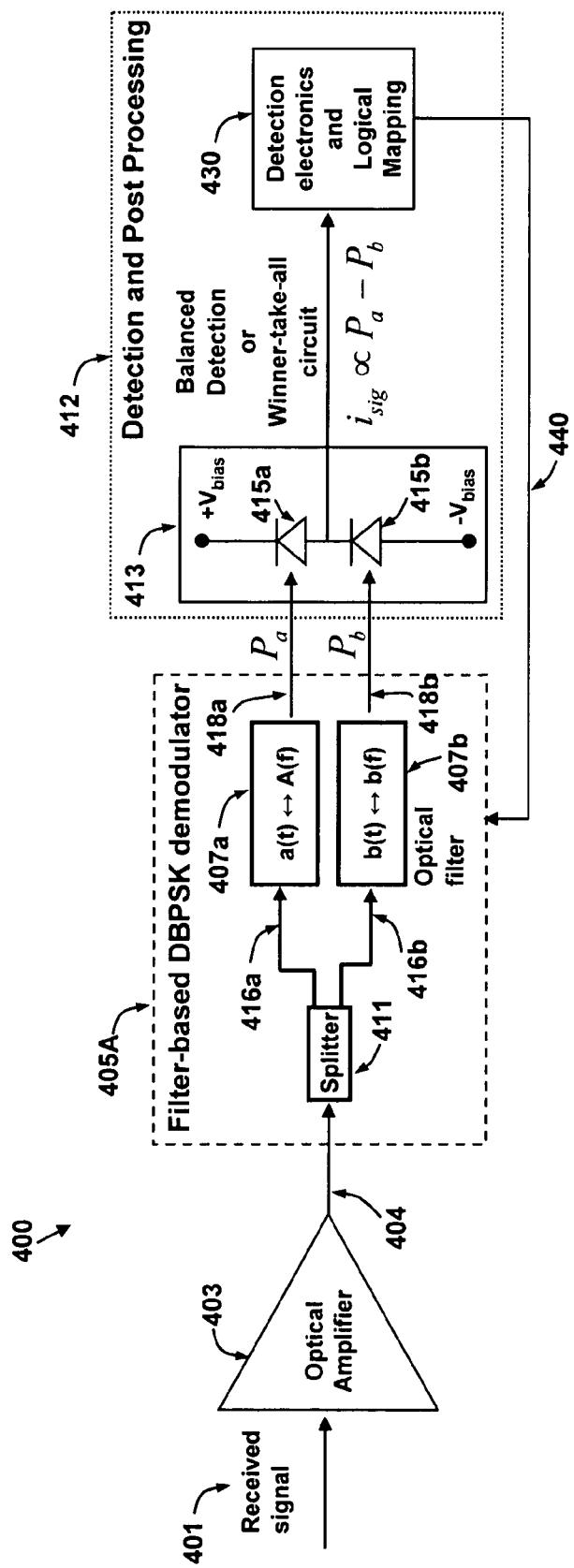
FIG. 4A is a schematic diagram of a DBPSK preamplified receiver according to example embodiments.

FIG. 4A illustrates a single channel DBPSK preamplified receiver 400 according to example embodiments. Similar to the preamplified receiver 100 of FIG. 1A, in operation the receiver 400 may receive a DBPSK signal 401. The received signal may be amplified by an optical amplifier 403. The amplified optical signal 404 is then filtered and demodulated with use of the filter-based DBPSK demodulator 405A.

The DBPSK demodulator 405A may utilize an optical splitter 411 and two optical filters 407a and 407b, modeled by the derived transfer functions of Eqs. (5) and (6). While mathematically equivalent to the DI outputs in a conventional matched DBPSK demodulator, such as the DI-based demodulator 101 of FIG. 1A, the a and b filters 407a and 407b, respectively, of FIG. 4A can be realized directly using two narrowband optical filters without the use of the broadband DI.

Upon entering the demodulator 405A, the amplified signal 404 is first spilt into two beams of approximately equal intensity via an optical splitter 411. The a and b filters 407a and 407b, respectively, each receives one of the split signals 416a and 416b, also referred to as a first portion and second portion of the signal, respectively. The first portion 416a and the second portion 416b of the optical signal are filtered by the a filter 407a and b filter 407b, which output filtered waveforms 418a and 418b with respective powers $P_a$ and $P_b$. The filtered outputs 418a and 418b are then received by the detection and post processing portion 412 of the receiver 400. This typically includes balanced detection 413 which may convert the incident optical signals 418a and 418b into an electrical signal that is proportional to the power difference between $P_a$ and $P_b$.

A thresholding circuit may then be used to convert the electrical signal into logical data. Alternatively, the detection and post processing portion 412 may use a winner take all (WTA) decision processes which picks the maximum signal from the outputs 418a and 418b of the filter-based demodulator 405A and then maps the result into the appropriate logic. For the binary case, this is the equivalent to performing the threshold operation just described, but for the M-ary case, the WTA approach may provide a scalable way for determining the best output from a bank of M-matched filter demodulators. A threshold circuit may also be used in the M-ary case and may be easier to implement than the WTA approach, especially at high speeds, but generally there is a performance penalty relative to the optimum pick-max capability of the WTA. This penalty can be minimized with the use of an adaptive threshold which may incorporate bit-error-rate or other feedback information such as received optical power to optimize performance. The output from the balanced detection or WTA circuit may subsequently be passed to the detection electronics and logical mapping portion of the receiver 430, which may convert these inputs into logical data. Other functions that may be performed in the detection electronics 430 include clock recovery, forward error correction (FEC), deinterleaving, all or part of which may be used to generate control signals 440 that may be used to optimize or adjust elements within the filter-based DPSK demodulator 405A.

Figures 4B, 4C:
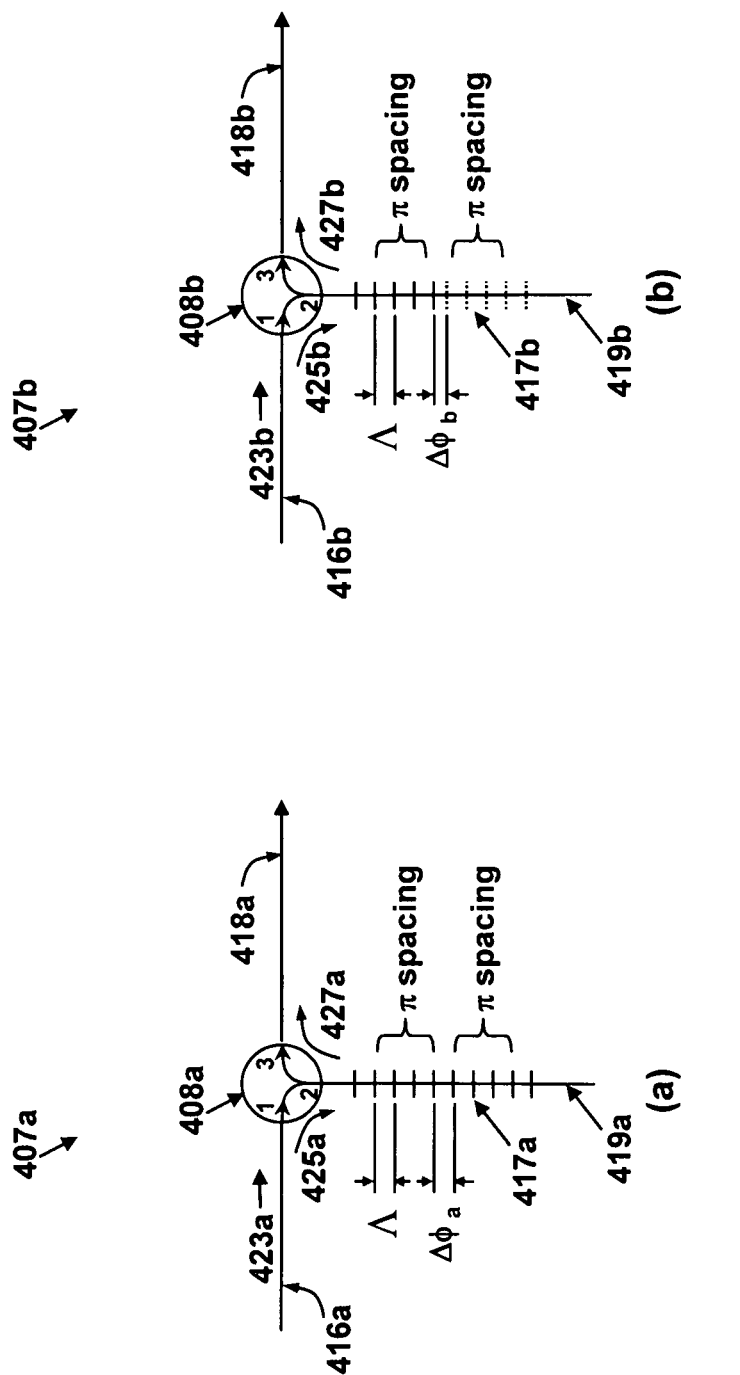
FIGS. 4B and 4C are schematic diagrams of representative demodulating filters of FIG. 4A implemented with fiber Bragg grating (FBG) filters according to example embodiments.

FIGS. 4B and 4C illustrate example embodiments of the a and b filters 407a and 407b, respectively, of FIG. 4A. Each filter 407a (FIG. 4B) and 407b (FIG. 4C) may include a waveguide 416a and 416b featuring a Bragg grating 417a and 417b, respectively. It should be appreciated that any other known type of grating may be employed. The waveguide may be a fiber-based or integrated structure. In the a filter 407a of FIG. 4B, an optical signal 423a may first enter the input waveguide 416a of the filter 407a and, thereafter, the optical signal 425a may enter the grating portion 417a of the filter 407a. For reflective filters, a circulating element such as a bidirectional optical coupler or a circulator can be used to direct the input signal 423a in waveguide 416a to the Bragg grating 417a and direct the filtered reflection towards the output 418a. In the collinear geometry illustrated, the Bragg grating period Λ is typically a half wavelength or π radians such that the reflected round trip is equal to a full wave. This relationship generally applies for this geometry such that the optical phase delay experienced by the signal Δφ=2Λ (twice the grating period). The grating 417a of the a filter 407a may be configured to have a reflective impulse response that matches the DBPSK symbol waveform with a differential phase difference of 0 radians. In this case, $\Delta\phi_a=m\pi$, where m is an integer, and applies a relative phase shift of $2\Delta\phi_a$ to the departing optical signal. Typically, m=1, so that the period is the same as the Bragg period, and therefore does not induce an additional phase change. The grating may be a weakly reflecting grating so that the grating strength over its length is proportional to the time-domain impulse response. Example impulse responses for a and b filters matched to square and Gaussian waveforms are given in FIGS. 5 and 6. The reflected output may therefore be matched to the in phase differentially encoded optical signals 423a which will interfere constructively and be directed through the circulating element 427a and thereafter exit the filter 407a on an output fiber 418a. In this manner, the in-phase optical signal is passed by the filter 407a. Out-of-phase optical signals with a relative phase difference of π radians would interfere destructively upon reflection from filter 407a, thereby being rejected by filter 407a and directed towards the waste port 419a.

The grating 417b of the b filter 407b of FIG. 4C is similar to filter 407a but applies a phase shift $2\Delta\phi_b$ to the reflected optical signal 418b. The location of the phase shift $\Delta\phi_b$ may be near the midpoint of the Bragg grating 417b so that the phase of the optical signal reflecting off the first half of the grating is shifted $2\Delta\phi_b$ relative to the optical signal reflection off the second half of the grating, thus enabling the differential phase comparison for consecutive pulses that are separated by a time corresponding to the optical transit time through the grating (which corresponds to twice the round trip through half the grating). For the b filter to be matched to the out-of-phase differentially encoded optical signals, $2\Delta\phi_b=\pi$, or equivalently, $\Delta\phi_b=\pi/2$. In general, however, the phase shifts $\Delta\phi_a$ and $\Delta\phi_b$ can be set to an arbitrary value to match the DPSK symbols.

Thus, in this case the reflected output may therefore be matched to the out-of-phase ($\pi$ phase shifted) differentially encoded optical signals 423b which will interfere constructively and be directed through the circulating element 427b and thereafter exit the filter 407b on an output fiber 418b, thereby passing the intended symbol that the filter was matched to. In-phase optical signals with a relative phase difference of 0 radians would interfere destructively upon reflection from grating 417b, thereby being rejected from filter 407b, and be directed towards the waste port 419b.

In other words, an optical signal with two consecutive symbols that are substantially in-phase are passed by filter 407a and blocked by filter 407b. Conversely, an optical signal with two consecutive symbols that are substantially out-of-phase are blocked by filter 407a but are passed by filter 407b. Hence, filter 407a and filter 407b are substantially matched to their respective (orthogonal) binary differential encoded phase modulated (2-DPSK) symbols and are themselves mutually orthogonal.

Accordingly, the optical DBPSK signal output from 418b of the b filter 407b of FIG. 4C in this example is also substantially orthogonal with respect to optical signal 418a of the a filter 407a of FIG. 4B. DBPSK typically uses an orthogonal symbol set (e.g., the 0 and $\pi$ relative phase difference used in the previous example) since it provides the largest signaling distance and best receiver sensitivity. However, an orthogonal symbol set may not be a strict requirement of DPSK since non-orthogonal symbols may still be readily distinguishable. Rather it is a luxury for binary DPSK, since M-DPSK is not generally orthogonal. However, regardless of the orthogonality of the symbol set, the optical filters of this invention, e.g., 407a and 407b may be configured to be matched to an arbitrary phase difference by adjusting the phase shift $\Delta\phi_a$ and $\Delta\phi_b$ at the midpoint of each respective grating. It should also be appreciated that the filters 407a and 407b may be tuned to the wavelength value of the incoming signal 401 with the use, for example, of device temperature, opto-mechanical changes (e.g., using piezoelectric device), a (nonlinear) optical effect (e.g., an optically induced change in refractive index), or other means. It should also be appreciated that an impulse response of the filters 407a, 407b may be matched to the shape of the incoming signal 401 in order to achieve the optimum receiver sensitivity.

Figure 4D:
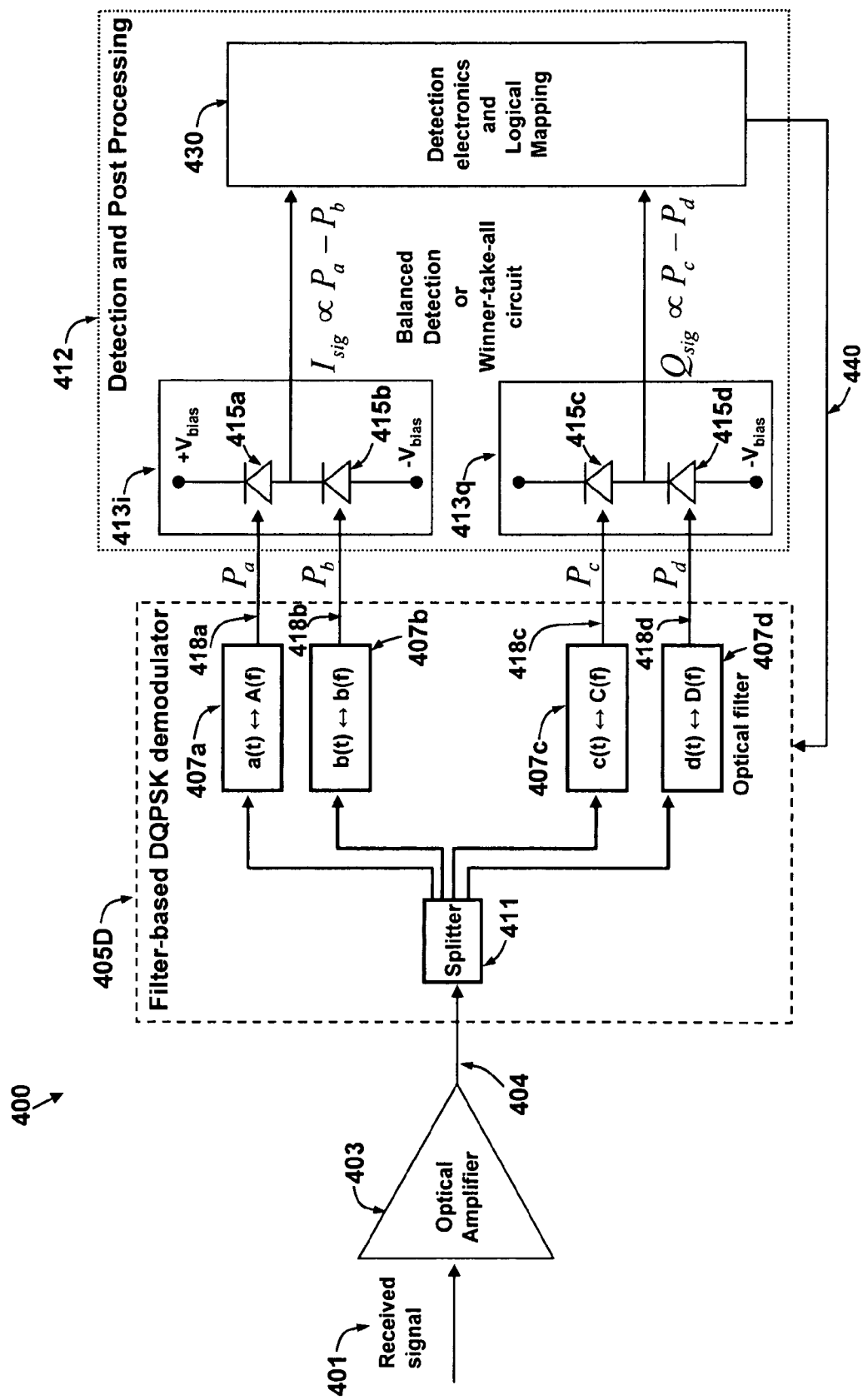
FIG. 4D is a schematic diagram of a DQPSK preamplified receiver according to example embodiments.

The filter-based approach of demodulating DBPSK (2-DPSK) shown in FIGS. 4A-4C can be extended to DQPSK (4-DPSK) as shown in FIG. 4D. In 4-DPSK, the relative phase difference between symbols is a multiple of $2\pi/4=\pi/2$ or 90 degrees, typically implemented with the 0, $\pi/2$, $\pi$, and $3\pi/2$, symbol alphabet, carrying $\log_2(4)$ or 2 bits per DQPSK symbol. Alternatively this constellation may be offset by a predetermined $\pi/4$ shift to yield $\pm\pi/4$ and $\pm3\pi/4$ symbol alphabet. Relative to the 2-DPSK demodulator 405A in FIG. 4A, the 4-DPSK demodulator in FIG. 4D may require a splitter 411 with 4 outputs of approximately the same power, and two additional filters c 407c and d 407d to implement the filter-based demodulator 405D, one filter approximately matched to the impulse response of each symbol, with the $i^{th}$ filter having a relative phase shift $\Delta\phi_i$ determined by the symbol that it is matched to. As in the DBPSK case, filters such as grating-based filters described in FIGS. 4A and 4B may be used to implement the demodulator. The four outputs a 418a through d 418d from the DQPSK filter-based demodulator 405D can be subsequently processed using techniques known in the art in a manner similar to the conventional DQPSK demodulator 151 shown in FIG. 1B. Balanced detection is typically used to generate the I and Q output signals for convenience. More generally, however, a WTA circuit may be used to process the 4 outputs 418a through 418d along with the use of mapping to convert the post-processed signals to logical data.

Figure 4E:
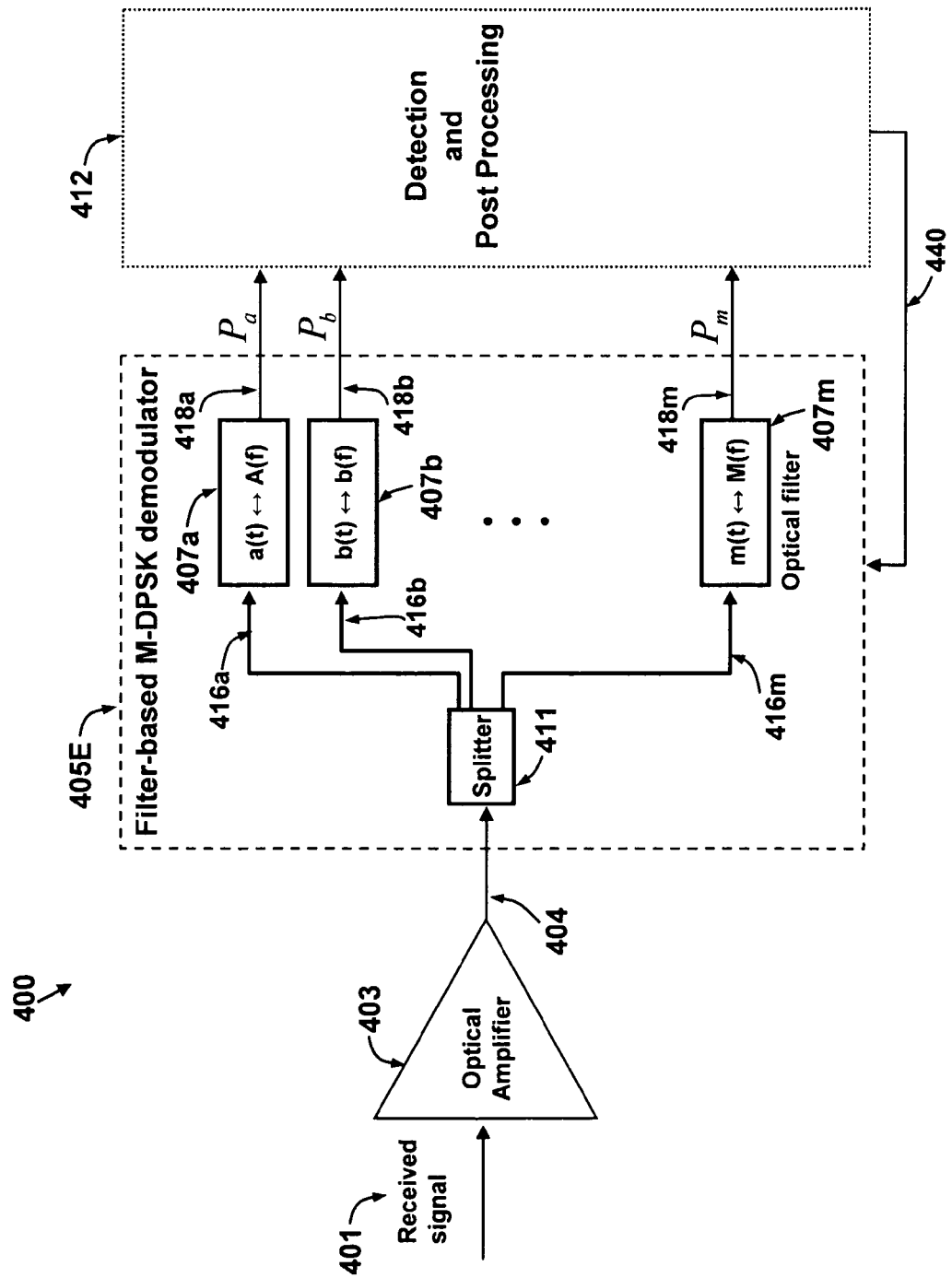
FIG. 4E is a schematic diagram of an M-DPSK preamplified receiver according to example embodiments.

FIG. 4E extends this filter-based DPSK demodulator approach to M-DPSK. In this case, the splitter 411 requires M outputs of roughly the same power, and M filters 407a through 407m approximately matched to the M-symbols in the constellation. The logical data associated with a received symbol can be determined in the detection and post processing portion of the receiver 412, which may use a WTA circuit and appropriate mapping. Note that while typical filters may be implemented with uniform gratings of period $\Lambda$ approximately equal to $\pi$ (excluding the differential phase change $\Delta\phi_i$ associated with the differential decoding), non uniform or chirped gratings may be used with this approach as needed to match the transfer function or impulse response of the corresponding differentially encoded symbol. In this manner, the filters in the RX can be used to compensate for undesirable characteristics in the transmitted or received waveforms and maintain the ability to achieve matched filtered performance.

Figure 5:
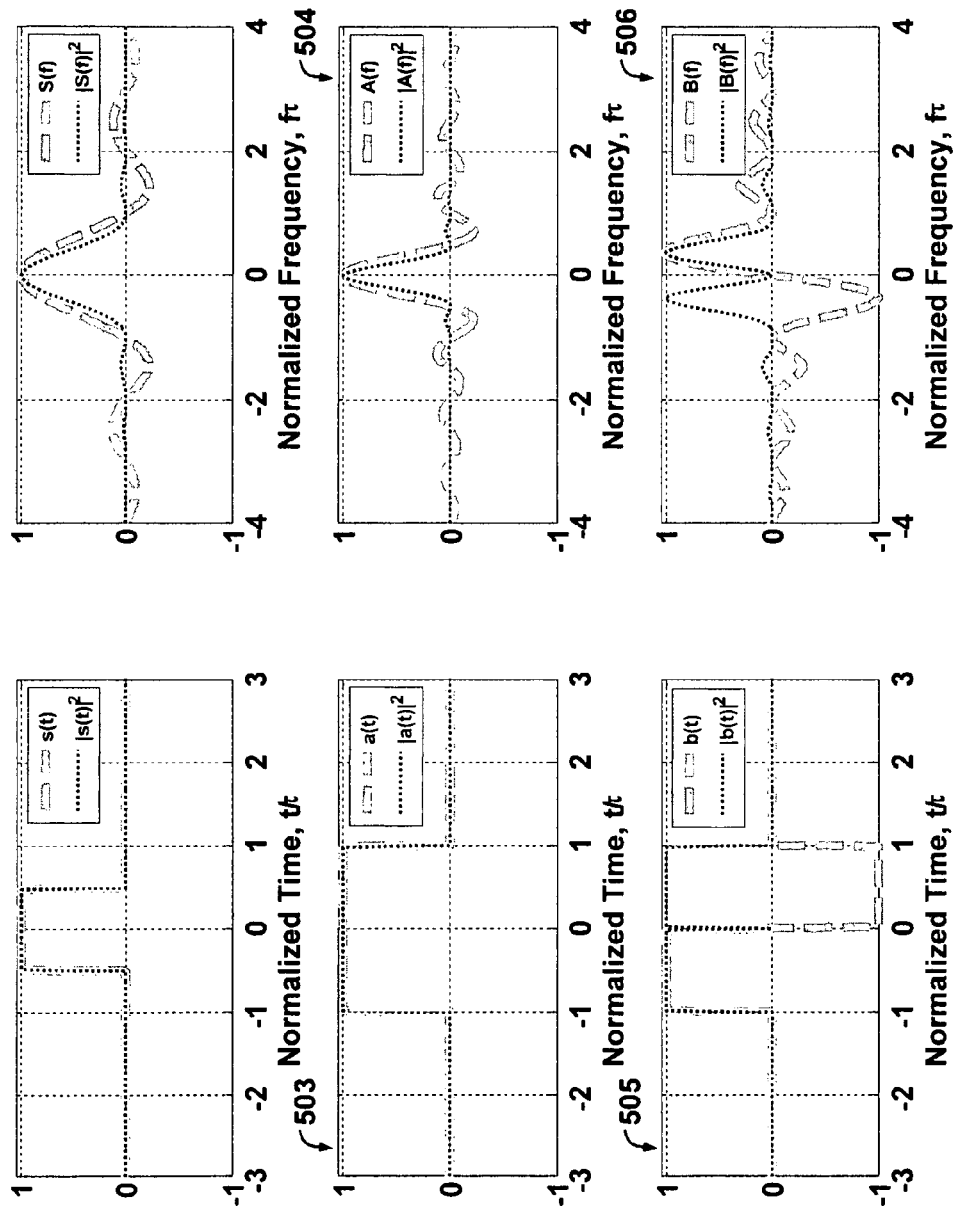
FIGS. 5 and 6 are graphical depictions of signaling waveforms and corresponding DBPSK matched filters according to example embodiments.

FIG. 5 provides an illustrative example of a received square signaling waveform s(t), waveforms corresponding to the DBPSK matched filters a(t) and b(t), and their field and intensity spectra normalized to the bit period with $\tau=\tau_{bit}$. The received square signaling waveform, represented by graph 501, may be square non-return-to-zero (NRZ) waveforms, i.e., $s(t)=u(t+\tau/2)-u(t-\tau/2)$, where u(t) is a unit step function. The optimum receiver filter transfer functions may then become:

$$a(t)=s(t+\tau/2)+s(t-\tau/2)=u(t+\tau)-u(t-\tau) \qquad (7)$$

$$b(t)=s(t+\tau/2)-s(t-\tau/2)=u(t+\tau)-2u(t)+u(t-\tau), \qquad (8)$$

which are illustrated in graphs of a(t) 503 and b(t) 505. FIG. 5 also illustrates the field and intensity spectra of the square signaling waveform S(f) 502 and corresponding DBPSK matched filters A(f) 504 and B(f) 506. The illustrative performance of the filter pair a(t) and b(t) is equivalent to the performance that may be provided by a matched filter and separate DI based demodulator 101 of FIG. 1A Filters matched to these waveforms (and the corresponding DBPSK symbols) may be implemented with optical filters, such as grating-based filters, without a DI. Filter a, for example, may be implemented using a weakly reflecting uniform FBG of length $\tau(c/n_{eff})$, where $c/n_{eff}$ is the effective speed of light within the uniform FBG. Note that the grating length in this case is equal to the delay $\tau$, but since the signal is reflected it experiences the round-trip through the FBG, increasing the delay by a factor of 2. Similarly, filter b may be implemented with a same FBG design, but with a 180 degree or $\pi$ phase reversal at the FBG midpoint, as illustrated in FIG.

4C. It should be appreciated that any other optical filter device known in the art that can implement these transfer functions may be employed.

The filter-based DPSK demodulator approach, presented herein, may accommodate a wide variety of signaling waveforms. Gaussian-like waveforms, for instance, are particularly attractive for achieving robust matched filter performance and reducing parasitic penalties (such as timing jitter).

Figure 6:
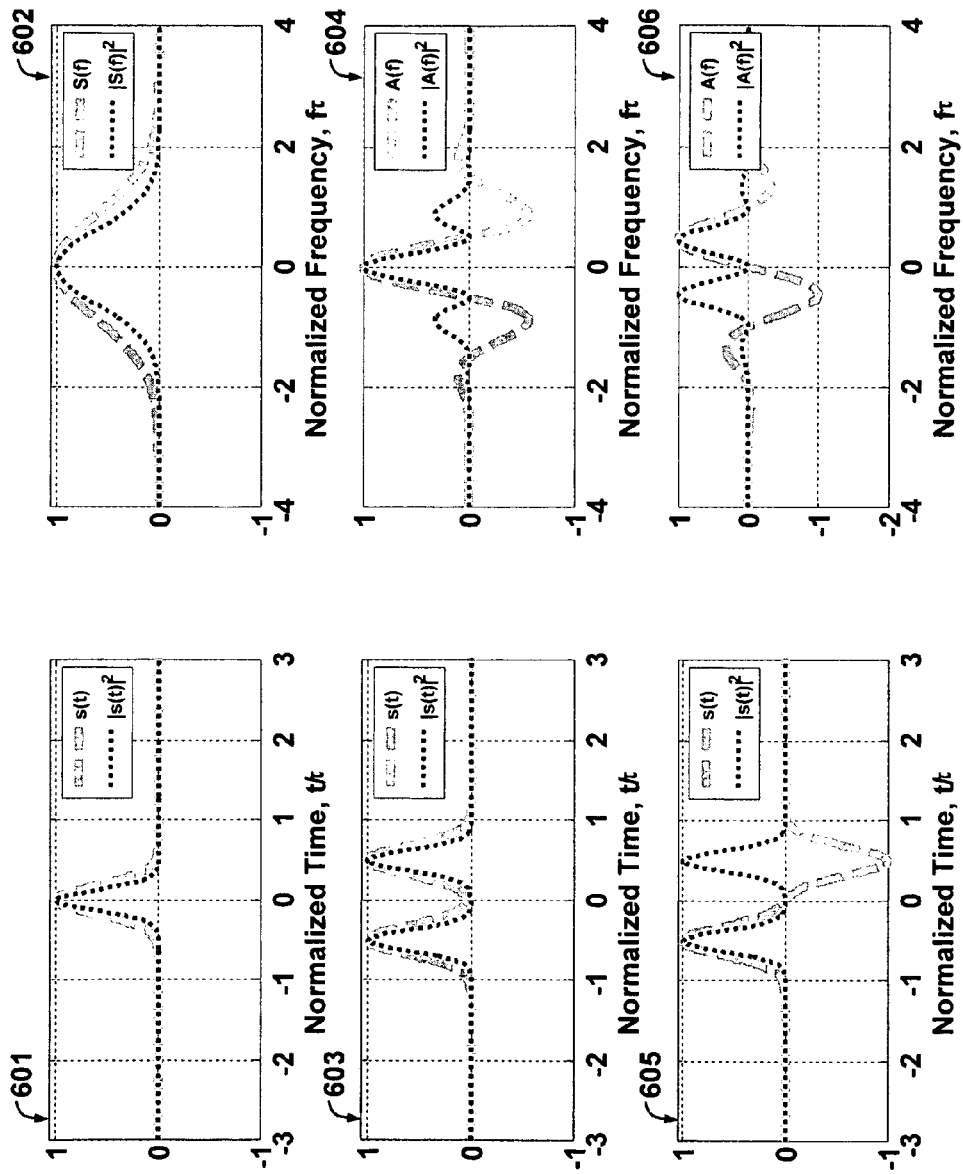

FIG. 6 illustrates a Gaussian signal s(t) 601 and corresponding matched a(t) 603 and b(t) 605 filter waveforms. FIG. 6 also illustrates the field and intensity spectra of the Gaussian signal waveform S(f) 602 and the corresponding DBPSK matched filters A(f) 604 and B(f) 606. The illustrated Gaussian signaling waveform s(t) has a FWHM=0.3τ. Similar to the filters of FIG. 5, these waveforms are all normalized to the bit period with $\tau = \tau_{bit}$. t Performance of the narrow-band filter pair a(t) and b(t) of FIG. 6 is equivalent to the optimum performance that may be provided by the conventional DI-based demodulator 101 of FIG. 1A and separate matched filtering, while eliminating the need for the costly broad-band DI.

While FIGS. 4A-6 illustrate a filter-based demodulator for a single channel system, it should be appreciated that multi-channel systems may also utilize filter-based demodulation. For example, such optical filters may be implemented similar to the filters above with appropriate apodization using grating-based or other optical filters, that may include arrayed waveguide grating (AWG) filters. It should be appreciated that other known optical filters may be employed in multi-channeled systems.

Figure 7A:
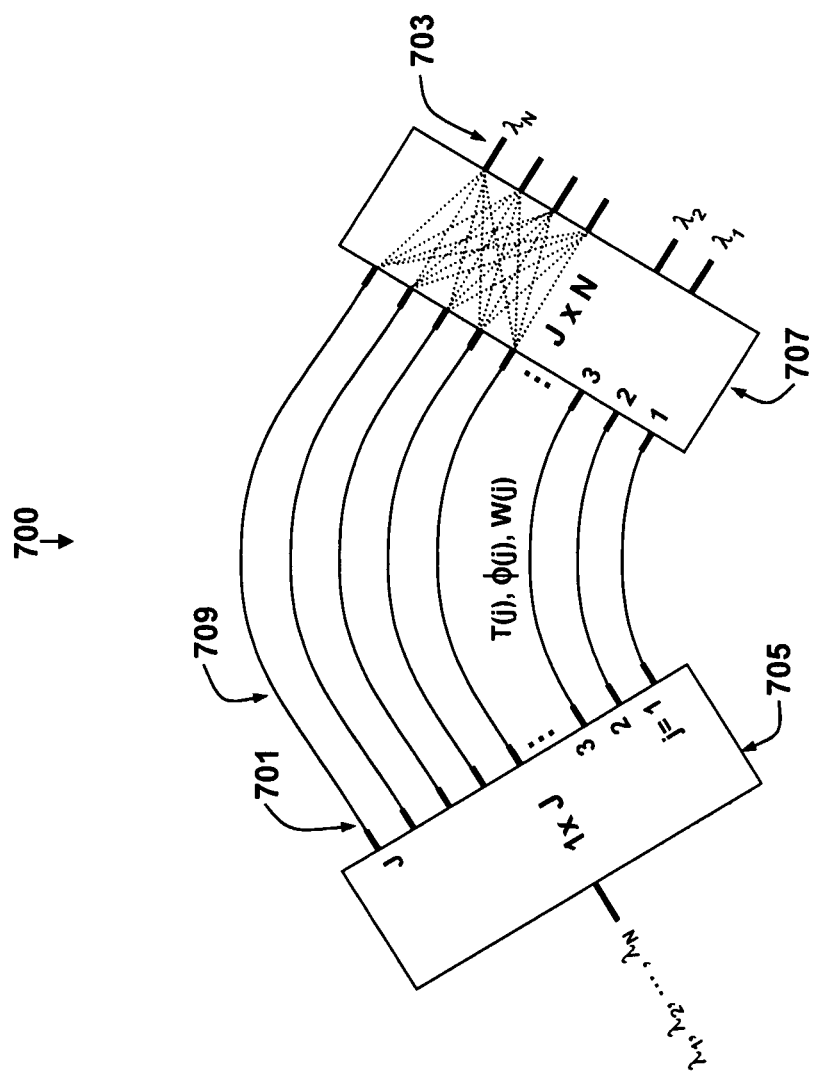
FIG. 7A is a schematic of an arrayed waveguide grating (AWG) according to example embodiments.

FIG. 7 depicts a basic schematic of a 1×N arrayed AWG filter-demultiplexer 700, where J represents a number of input arms 701 and N represents a number of input wavelengths and output arms 703. The characteristic delay, phase, and weighting profiles of the AWG may be represented by array functions T(j), φ(j), and W(j), respectively.

The AWG-type filters shown in FIG. 7 are particularly attractive since they may be configured to perform filtering, demodulation, and wavelength demultiplexing simultaneously. Moreover, the optimum time-domain waveforms needed in the a and b filters for a given waveform can be generated through appropriate delay, phase, and weighting of the arms in the array by functions T(j), φ(j), and W(j) respectively, where j represent the characteristics of the $j^{th}$ arm.

AWGs typically include an input coupler, typically a J×J star coupler (not shown), within an input sub-component 705, with only one of the J inputs being used in the illustration. The inputs may be distributed over the J arms 701 in the array 709 and then received by the J×N output coupler 707. The length of the arms 701 in the array increases with a constant increment so that the delay function T(j) can be described by:

$$T(j)T_o + \frac{(j-1)\tau_d}{J}, \quad (9)$$

where $T_o$ is the time delay of the shortest arm (j=1). The frequency bandwidth of the output passband may be approximately $\Delta v \approx 1/\tau_d$ or equivalently, wavelength bandwidth $\Delta \lambda = v/(\tau_d \lambda^2)$, where v is the speed of light in the array waveguides 709. For example, if $\tau_d$=80 psec, $\Delta v \approx 12.5$ GHz, and at 1550 nm, $\Delta \lambda$=0.1 nm.

$\Delta t = \tau_d/J$ is the constant time increment, and j is an integer between 1 and J. Typically J may be relatively large ranging from a few tens to a few hundred samples depending on the number of desired wavelength channels and the spectral periodicity of the AWG filter, which is often referred to as free-spectral range (FSR). The FSR=1/Δt=J/$\tau_d$ as is known by those skilled in the art.

Each of the N input wavelengths at the input sub-component 705 of the AWG 700 may be coupled into the waveguide arms 701 of the array 709 and experience a constant phase shift due to the delay function. At the output sub-component 707, light from each array arm 701 of the grating interferes constructively or destructively depending on the array phase shift and the wavelength. The $n^{th}$ wavelength may constructively interfere at the $\lambda_n$ output (where the Bragg phase matching condition is met) and all other N−1 wavelengths destructively interfering at the $\lambda_n$ output so that the AWG 700 functions as a wavelength division demultiplexer (WDM).

The time-domain output from the AWG 700 may be proportional to a weighted sum of the delayed array elements. With proper selection of the number of arms and their weighting, delay, and phase functions, the output may be tailored to be sampled versions of a continuous function, such as those shown in FIGS. 5 and 6. The spectral shape of the filter centered at each output wavelength is the Fourier transform of the time-domain field output, with the bandwidth being inversely proportional to the $\tau_d$. Since the input and output couplers 705, 707 typically include a free-space diffraction region (not shown), the weighting function T(j) is typically Gaussian, leading to Gaussian-like filter shapes. However, other weighting functions can be selected, for example, by configuring the input coupling coefficients to the waveguide array 709 or the waveguide transmission loss through a fixed design process (e.g., through a lithographic process) or using other reconfigurable techniques (e.g., thermo-optic, electro-optic, nonlinear optic, electro-mechanical MEMS based methods, etc.) that may allow for dynamic reconfiguration and optimization of the AWG filter-demodulator-demultiplexer so that it closely matches the desired DPSK symbol shape and relative phase difference. Similarly, the phase function φ(j) may be arbitrarily chosen either by design or a dynamically adjustable configuration via the same techniques that may be used to adjust the transmission weighting function. The characteristic functions that may be used to create a sampled version of the optimum a and b filters for the NRZ waveform of FIG. 5 in an AWG are given in Eqs. (10) and (11):

$$W_a(j) = 1 \quad (10)$$
$$\phi_a(j) = 0$$
$$T_a(j) = T_0 + \frac{(j-1)2\tau_{bit}}{J},$$

$$W_b(j) = 1 \quad (11)$$
$$\phi_b(j) = \begin{cases} 0, & 1 \leq j \leq \frac{J}{2} \\ \pi, & \frac{J}{2}+1 \leq j \leq J \end{cases}$$
$$T_b(j) = T_0 + \frac{(j-1)2\tau_{bit}}{J},$$

where J is preferably even and typically a few tens to a few hundred arms and $\tau_{bit}$ may approximately be the duration of the symbol. More general characteristic functions for the matched DBPSK a and b filters may be determined from the left hand side of Eqs. (7) and (8) and correspond to the characteristic functions in Eqs. (12) and (13)

$$W_a(j) = \left| s\left(\frac{(J-j)2\tau_{BIT}}{J} - \frac{\tau_{BIT}}{2}\right) + s\left(\frac{(J-j)2\tau_{BIT}}{J} - \frac{3\tau_{BIT}}{2}\right) \right| \quad (12)$$

$$\phi_a(j) = 0$$

$$T_a(j) = T_0 + \frac{(j-1)2\tau_{bit}}{J},$$

$$W_b(j) = \left| s\left(\frac{(J-j)2\tau_{BIT}}{J} - \frac{\tau_{BIT}}{2}\right) + s\left(\frac{(J-j)2\tau_{BIT}}{J} - \frac{3\tau_{BIT}}{2}\right) \right| \quad (13)$$

$$\phi_b(j) = \begin{cases} 0, & 1 \leq j \leq \frac{J}{2} \\ \pi, & \frac{J}{2}+1 \leq j \leq J \end{cases}$$

$$T_b(j) = T_0 + \frac{(j-1)2\tau_{bit}}{J}.$$

Figure 7B:
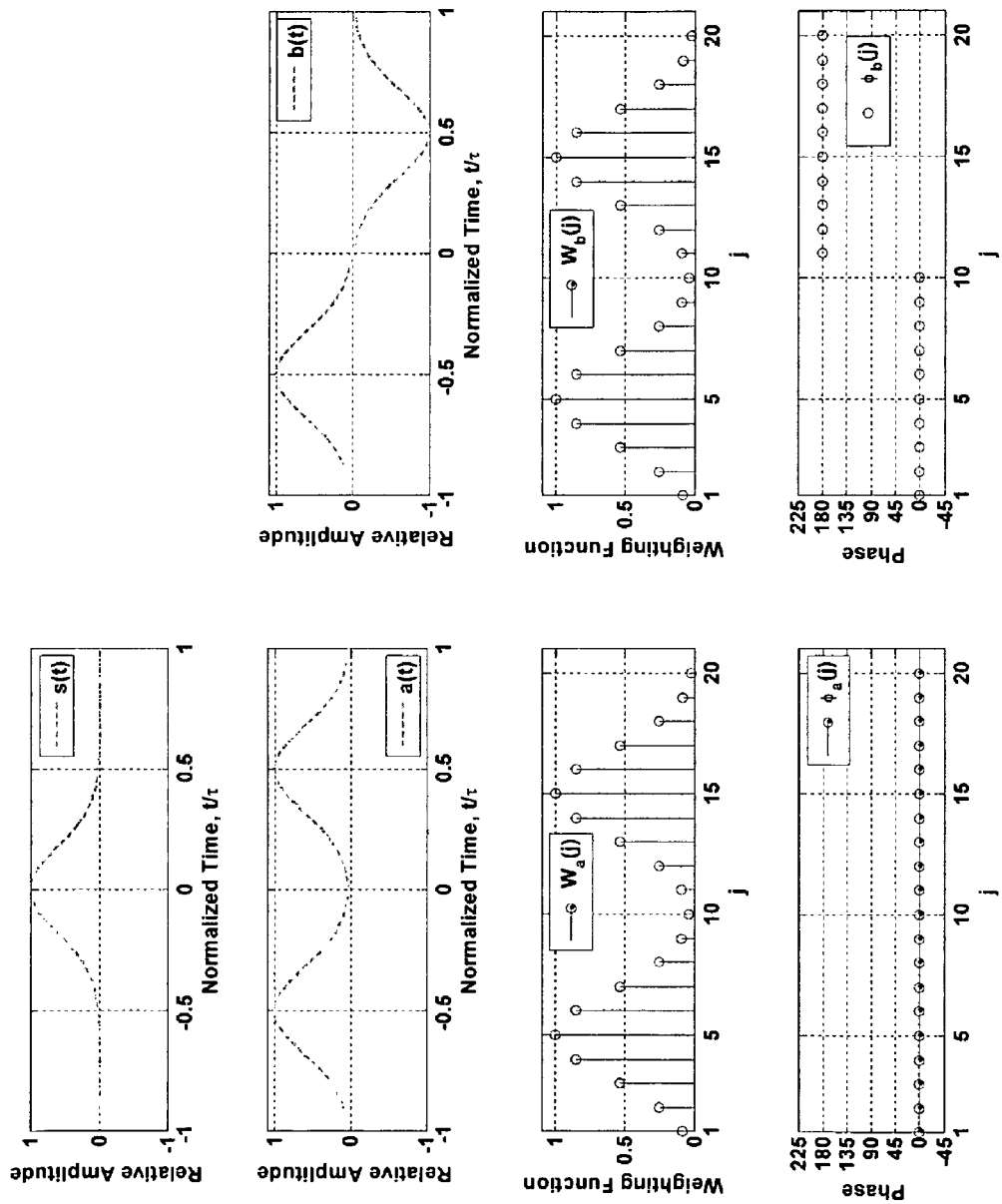
FIG. 7B is a graphical depiction of signaling waveforms associated with the AWG of FIG. 7A according to example embodiments.

The weighting coefficients $W_a(j)$ and $W_b(j)$ (generically $W_i(j)$) are the sampled magnitude of the $i^{th}$ filter waveform $h_i(t)$, which for the binary case the are $h_a(t)=a(t)$ and $h_b(t)=b(t)$; and $\phi_i(j)$ function is the sampled phase of the $i^{th}$ filter. This is illustrated in FIG. 7B for a Gaussian signal waveform (shown also in FIG. 6). The signal waveform s(t) 750 may be used to generate the a 760 and b 765 filters by making use of the left hand side of Eqs. (7) and (8). Sampling the magnitude and phase of a and b waveforms as described above and in Eqs. (12) and (13) yields the $W_i(j)$ and $\phi_i(j)$ coefficients 770, 775, 780, and 785. Thus, with this type of AWG-based filter, nearly optimum filtering, 2-DPSK demodulation, and wavelength demultiplexing may be achieved. Extending the binary case to the M-DPSK, the general characteristic functions for the $i^{th}$ filter may be implemented with $$W_i(j) = \left| s\left(\frac{(J-j)2\tau_{BIT}}{J} - \frac{\tau_{BIT}}{2}\right) + s\left(\frac{(J-j)2\tau_{BIT}}{J} - \frac{3\tau_{BIT}}{2}\right) \right| \quad (14)$$

$$\phi_i(j) = \begin{cases} \theta_i(j) + 0, & 1 \leq j \leq \frac{J}{2} \\ \theta_i(j) + \frac{2\pi i}{M}, & \frac{J}{2}+1 \leq j \leq J \end{cases}$$

$$T_i(j) = T_0 + \frac{(j-1)2\tau_{bit}}{J},$$

where $\theta_i(j)$ is the sampled phase of the $h_i(t)$ filter waveform if it is complex. Thus, with M-filters having these characteristics, e.g. M-AWG filters, nearly optimum filtering, M-DPSK demodulation, and wavelength demultiplexing may be achieved. Note that while the information contained on different WDM channels may typically be independent, they may also be associated with a 2-dimensional differentially encoded phase and wavelength constellation.

Figure 8:
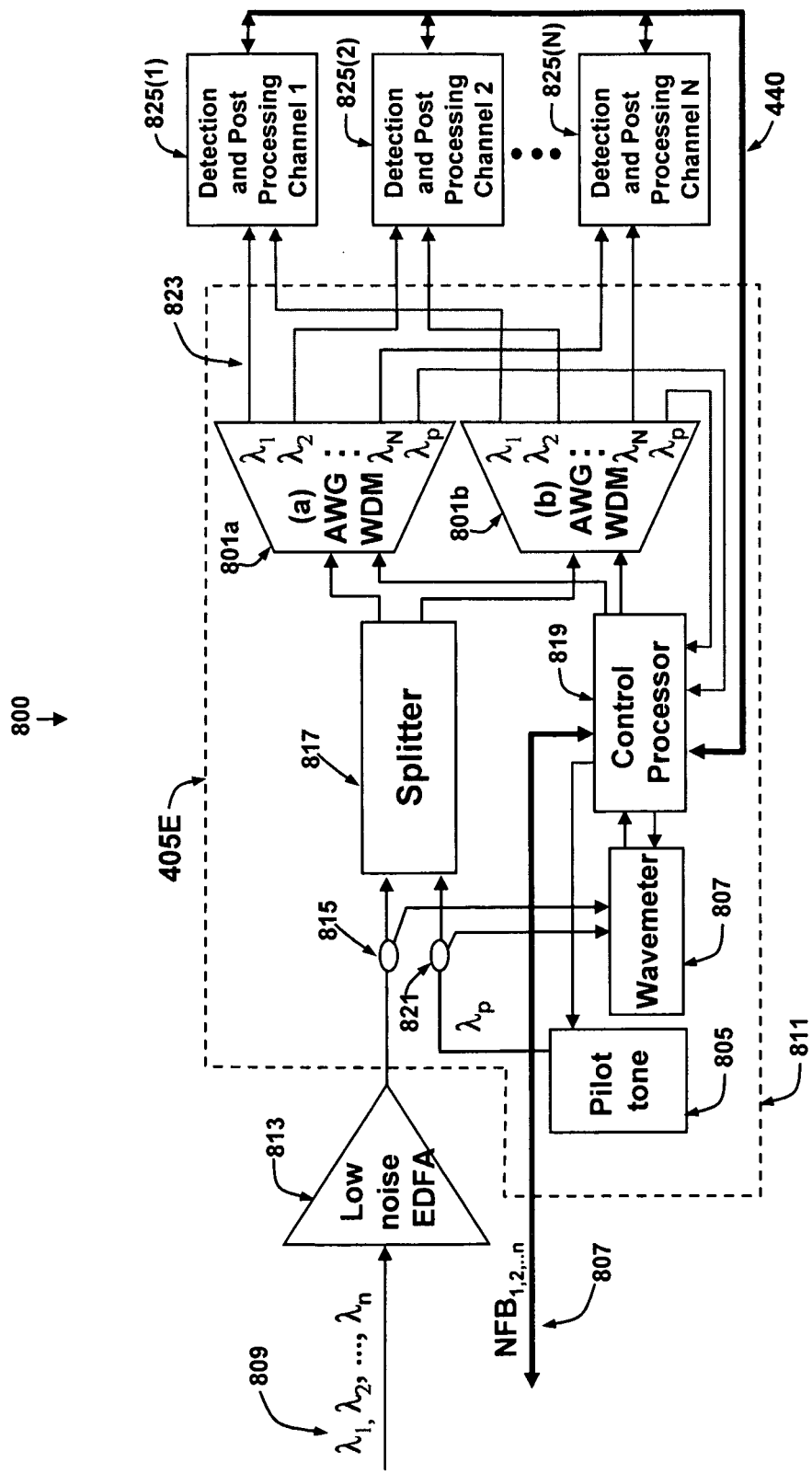
FIG. 8 is a schematic of a Wavelength Division Multiplexing (WDM) DBPSK receiver according to example embodiments.

FIG. 8 is a schematic of a Wavelength Division Multiplexed (WDM) DBPSK receiver 800 using nearly optimal a and b filters 801a and 801b, respectively, including AWG-type elements which may perform filtering, demodulation, and WDM separation. Also shown is feedback and feedforward alignment capabilities which may be used to align the filters and incoming signals. The feedback and feedforward alignment capabilities may include a pilot tone generator 805 that may be configured to provide a pilot signal ($\lambda_p$) or master-channel, a wavemeter 807, channel power and bit-error rate (BER) monitors (not shown), and interactive communication with the (e.g., Network Feedback [NFB]) network 405F.

In operation, a multi-wavelength signal 809 may be received by the WDM DBPSK receiver 800. The multi-wavelength signal 809 may be sent to a preamplified filter-based WDM demodulator 811. The signal 809 may be amplified via a low noise erbium-doped fiber amplifier (EDFA) 813 or the like. The amplified signal may then be split via an optical splitter 815, where a portion of the amplified signal is sent to a second optical splitter 817, which may be a 50/50 splitter or other ratio, and the other portion of the amplified signal is sent to a wavemeter 807. With use of a pilot tone generator 805, wavemeter 807 and control processor 819, the array functions T(j), ($\phi$(j), and W(j) may be properly set to accommodate the wavelengths of the incoming signals 809.

A second optical splitter 817 may further split its received portion of the amplified optical signal into two further portions. A first portion of the twice split amplified optical signal may be transferred to the a AWG 801a and a second portion of the optical signal may be transferred to the b AWG 801b.

In the a AWG 801a, the first portion of the twice split amplified optical signal may be further split into a first plurality of optical signals with different wavelengths. By utilizing the array functions T(j), $\phi$(j), and W(j), an appropriate delay and constant phase shift may be applied to each wavelength individually. The a AWG 801a may then interfere and demultiplex the first plurality of optical signals onto respective output channels 823. The demultiplexed signals may then be transferred to post processing elements 825 (e.g., 825(1)-825(N)) for further signal processing.

In the b AWG 803, the second portion of the twice split amplified optical signal may also be further split to a second plurality of optical signals with different wavelengths. By utilizing the array functions T(j), ($\phi$(j), and W(j), an appropriate delay and constant phase shift may be applied to each wavelength individually. A sub-portion of the second plurality of optical signals may have a $\pi$ phase shift applied. Thus, as the b AWG 803 interferes and demultiplexes the second plurality of optical signals, the resulting demultiplexed signals may include a $\pi$ phase shift. The resulting signals may also be transferred to respective output channels 823 and then onto post processing channels 825.

Figure 9:
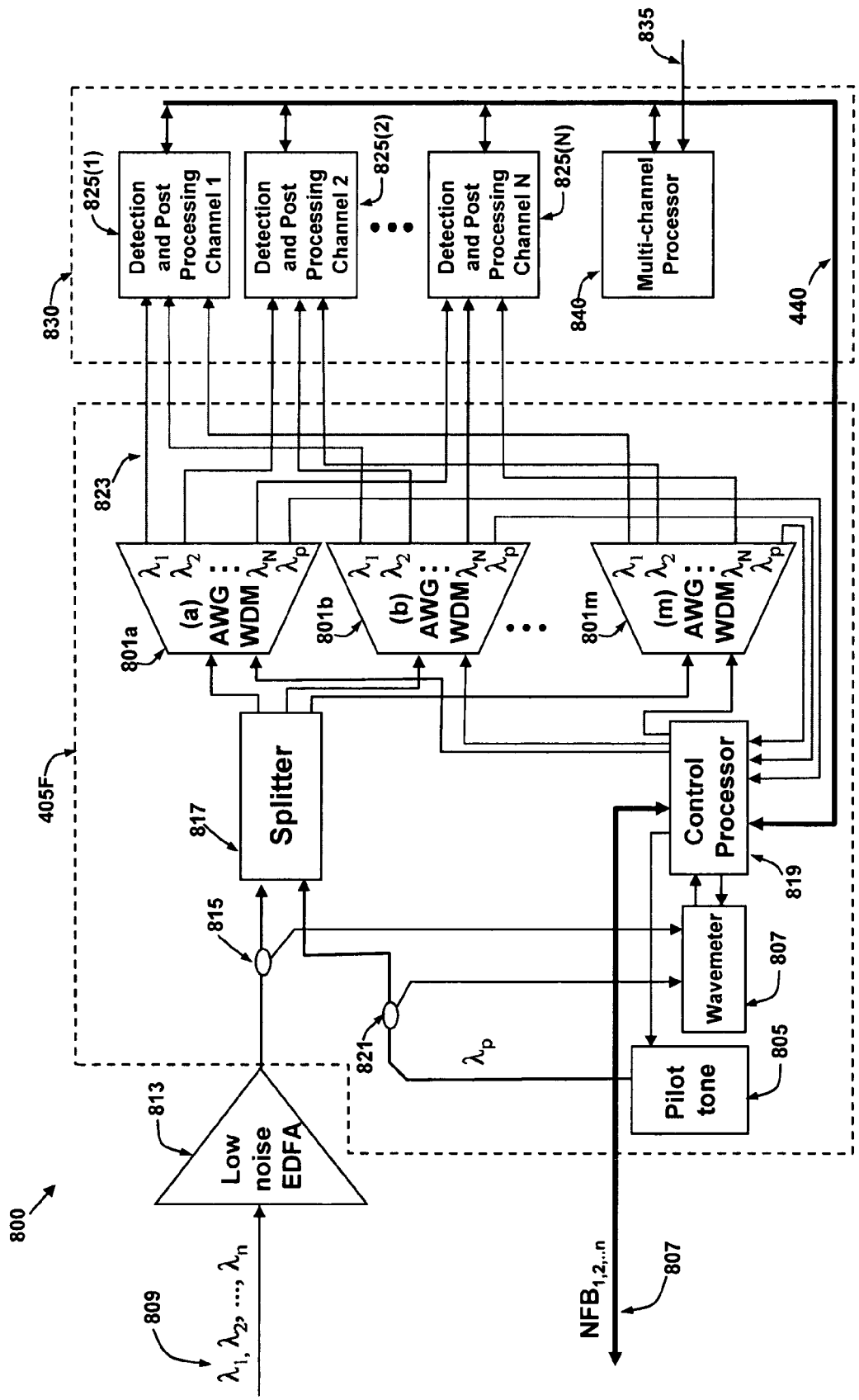
FIG. 9 is a schematic of a Wavelength Division Multiplexing (WDM) M-DPSK receiver according to example embodiments.
Figure 10:
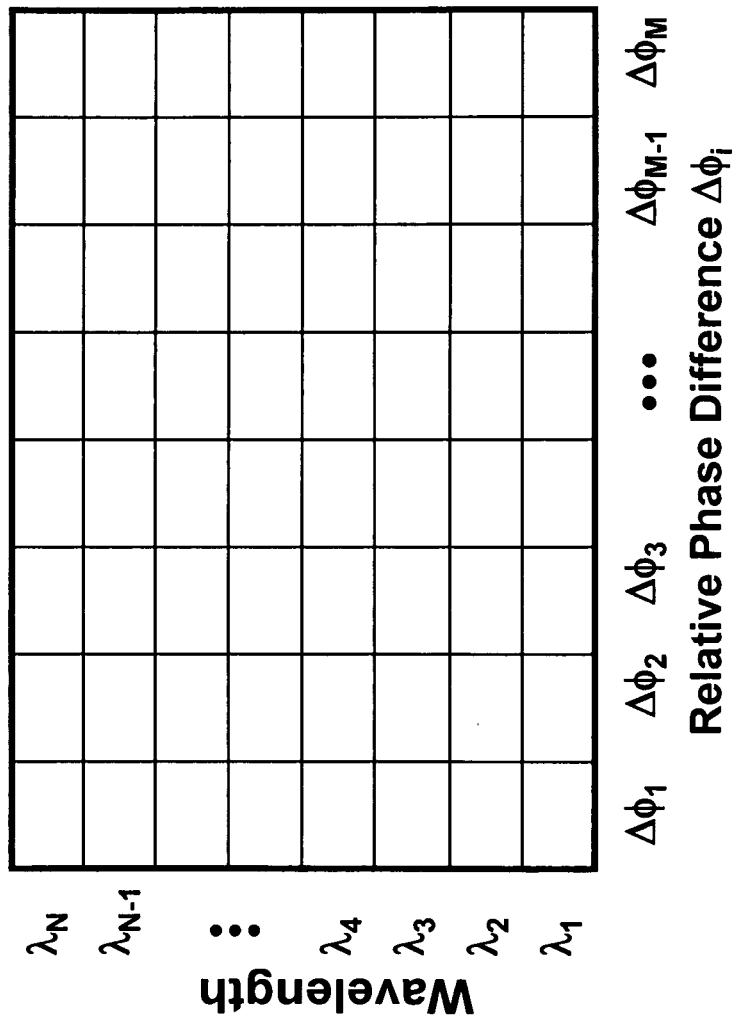
FIG. 10 is a schematic of a symbol set according to example embodiments.

Note that for DQPSK (4-DPSK), AWG-based WDM-filter-demodulators with ±$\pi$/4 and ±3$\pi$/4 differential phase shifts (or other desired phase shifts) may be readily implemented with the optical filter technologies mentioned above. Such filters may be implemented with differential phase shifts of $\Delta\phi_i=\phi_o+i2\pi/M$ (where i=1 to M) that may accommodate generalized M-DPSK filtering, differential demodulation and wavelength multiplexing. FIG. 9 is a schematic of such a WDM M-DPSK receiver 800 implemented with M AWG-type WDM filters 801a-801m. Each differentially encoded M-ary symbol carries log$_2$(M) bits. Typically, M may be an even power of 2 (e.g., 2, 4, 8, 16, . . . ) so that each symbol carries an integer number of bits. However, more generally, M may be any integer greater than 1. Relative to the binary case shown in FIG. 8, the M-ary WDM-filter-demodulator in FIG. 9 may require a splitter 817 with M or more outputs and one N-output AWG for each of the M-DPSK symbols, along with N-post-processing channels 825 to accommodate the N-independent WDM channels. Additional AWG output ports may be used to accommodate pilot control. Note that while the information contained on different WDM channels may typically be independent, it may also be associated with a 2-dimensional differentially encoded phase and wavelength constellation as shown for the case of N wavelengths and M differentially encoded phases as shown in FIG. 10. It should also be appreciated, although not shown in FIG. 10, the constellation, or symbol, set may also include wave shape (e.g., a square or Gaussian waveform shaping).

This approach can be used to implement nearly matched filtering, for high-sensitivity demodulation, and wavelength demultiplexing of M-DPSK optical signals. It should also be noted that the N-channel DBPSK demodulator of FIG. 8 offers significant benefits over conventional WDM-demodulation approaches of the type shown in FIG. 3. For example, in order to demodulate 40 DBPSK channels, two 40 channel AWGs and a 50/50 splitter may be needed for the filter-based approach illustrated in FIGS. 8 and 9 in comparison to one 40 channel AWG and 40 DIs (and associated control electronics) that may be needed for the conventional demodulator. For DQPSK, four 40-channel AWGs and a splitter with at least 4 outputs may be needed for the filter-based approach in comparison to a single 40-channel AWG and 80 DIs (and associated control electronics) needed for the standard approach.

Thus, the presented filter-based DPSK-demodulator-demultiplexer approach has the significant potential to reduce complexity and improve stability by eliminating the need for many delay-line interferometers, while maintaining the ability to achieve optimum performance, as shown above. As noted in the background section, DPSK's utility has been established with many long-haul fiber-optic experiments demonstrating multiple Tbit/s over long fiber spans with hundreds of WDM-DPSK (and DQPSK) channels ($\lambda$s). A properly designed differential phase filter-based demodulator wavelength division demultipler (DP-FDWDM) of the type illustrated in FIG. 9, may simultaneously filter, demodulate, and demultiplex an N×M constellation of N-channels (wavelengths) containing M-DPSK optical signals (e.g., FIG. 10). Moreover, this approach could be reconfigured to demodulate at least a subset of these channels or M-ary DPSK symbols. For example, an 8-DPSK DP-FDWDM may be used to demodulate 2-DPSK, 4-DPSK, and/or 8-DPSK optical signals on different wavelengths concurrently. This may be achieved by either reconfiguring the optical filters 801 in FIG. 9 and/or reconfiguring how the filtered and demodulated output signals 823 are interpreted and mapped in the multi-channel detection and processing section 830. For a given wavelength, for instance channel 2 in FIG. 9 which is detected and post processed by 825(2), the 8-DPSK demodulator may demodulate 2-DPSK optical signals using the 0 and $\pi$ phased AWG outputs and ignore the other 6 outputs for that wavelength incident on 825(2). To increase the data rate on this wavelength (channel conditions permitting), 4-DPSK optical signals may be demodulated by using the 0, $\pm\pi/2$, and $\pi$, phased outputs or alternatively using the $\pm\pi/4$ and $\pm3\pi/4$ outputs, without necessarily having to tune the phase of the filters. Thus, this type of reconfiguration may be achieved at high speeds (e.g., at MHz rates or higher), since it may be implemented primarily in the electronic domain, a feature that may enable bandwidth on demand or bandwidth when the channel conditions (e.g., noise, crosstalk, dropouts or fades, weather, PMD, received SNR, BER, current channel loading, bandwidth demand, etc.) permit. With communication through the network (NFB), corresponding transmitters may be informed of current channel conditions observed at the receiver so transmitter may reconfigure to maximize data rate, throughput, or security at the receiver. Expansion of the total received data rate may be achieved by adding more channels (wavelengths), increasing the symbol set on a particular wavelength, or some portion of both. Through preprogramming or control/data input 835, which may be user driven or derived from network commands, the multi-channel processor 840 may aggregate or sample data from one or more of the channel processors 825(1)-824(N) to evaluate overall channel conditions, encrypt or decrypt data, and/or receive, distribute, or update cipher keys. Such features may be used to maximize data rate, throughput, or security on one or more channels. The aggregate data for instance, or a subset thereof, may be used to form a multi-dimensional alphabet or constellation based on the N wavelengths and M-DPSK optical signals received. The ability to rapidly reconfigure the constellation may be used for improved security or net data throughput. Data from one wavelength may be used to decode, encrypt, or supplement another. Or, data from a disadvantaged wavelength, that may be limited to a 2-DPSK symbol set due to channel conditions, may be rerouted through a more advantaged channel that may be able to accommodate a larger M, and therefore, a higher data rate. Thus, a system comprised of a DP-FDWDM receiver and corresponding transmitter may provide a variable aggregate data rate that may be adapted to accommodate the demand for data and/or channel conditions as noted above.

In another example embodiment, an N-channel 2-DPSK DP-FDWDM system comprised of N-AWGs is upgraded to a system with N-channels of 4-DPSK by adding two more properly phased AWGs or similar filter-based demodulators. In this manner, the receiver maximum aggregate data rate doubles by increasing the symbols set from 2 to 4 (and the corresponding bits per symbol from 1 to 2) while maintaining the same symbol period. Thus, the data rate expansion can occur without having to substantially increase the electrical bandwidth of the transmitter or receiver electronics, or upgrade the channel dispersion or polarization mode dispersion (PMD) characteristics or compensation schemes. Expanding the alphabet size in this manner enables the scaling of the net data throughput by $\log_2(M)$ or equivalently by a factor of 2, 3, 4, . . . as M is changed from 2 to, 4, 8, 16 and so forth. Such capabilities may be beneficial in long haul fiber applications where the fiber plant (e.g., the undersea fibers and associated hardware) are expensive to deploy and upgrade. In this case, if the channel can accommodate the signal to noise ratio (SNR) needed to bridge the link with the expanded symbol set, this upgrade may occur with relatively low-cost modifications or upgrades at the transmitter and receiver, while leveraging most or all of the existing infrastructure. Note that with improvement in FEC coding, upgrades to the FEC hardware at the transmitter and receiver ends of the link may increase the overall link SNR by several dB, and this or other upgrades may enable a switch to a larger symbol set without necessarily having to modify the most expensive parts of the link, such as the channel infrastructure.

The filter-based DPSK demodulators disclosed, may also improve performance and/or reduce overall receiver cost, complexity, and size, weight, and power (SWAP) relative to the conventional filter and delay-line interferometer approach in both single channel and WDM applications. A benefit of the example embodiments presented may be achieved by combining filtering and differential phase comparison, which eliminates the need for the DI. This is useful since the DI is typically a technically challenging and costly element within the receiver.

Conversely, a filter-based DBPSK demodulator can be constructed from relatively inexpensive components. For example, the filter-based demodulator may include a 50/50 coupler, two circulators, and fiber Bragg grating filters that, once designed, may collectively cost much less than the DI.

Implementing the filter-based DBPSK, DQPSK, or M-DPSK receivers with AWG-type filters may enable optimal filtering, demodulation, and WDM separation of multiple wavelengths using only 2, 4, or M-AWG filters. In space-based applications, where size, weight, and power are critical expenses, generally far greater than the procurement cost, the benefits of this approach may be even greater than in terrestrial applications. It should also be noted that standard filter tuning techniques may be used to lock single-channel filter-based demodulators to an incoming signal or to hop between incoming channels. An added benefit of this combined WDM/filter/demodulator approach is that the filtering and differential phase comparison functions as described have the same tuning constant and, therefore, may be adjusted simultaneously. The filter-based method of demodulation disclosed may be well suited for M-DPSK receivers used in future free-space and fiber-optic networks.

It should be understood that the example embodiments, disclosed herein, may be implemented by a computer controlled machine using instructions implemented in hardware, firmware, or software. If implemented in software, the software may be stored on any form of computer readable medium, such as random access memory (RAM), read only memory (ROM), compact disk read only memory (CD-ROM), and so forth. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. An apparatus for demodulating a differentially encoded phase modulated signal, comprising:
    a first filter configured to perform differential demodulation and filtering of a first portion of the modulated signal to produce a first output; and
    a second filter configured to perform differential demodulation and filtering of a second portion of the modulated signal to produce a second output, the first and second outputs representing at least two differential phase encoded symbols of a symbol set available to be interpreted into data.

2. The apparatus of claim 1 wherein the symbol set is a multidimensional alphabet including symbols based on differentially encoded phase, color, wave shape, or any combination thereof.

3. The apparatus of claim 1 wherein the first and second filters are configured to be tuned to a phase of interest.

4. The apparatus of claim 3 wherein the first and second filters are further configured to be dynamically tuned.

5. The apparatus of claim 1 wherein the first and second filters include a plurality of filters producing respective outputs, and further including a detector configured to detect the outputs in a selectable manner.

6. The apparatus of claim 5 wherein the plurality includes a set of M filters in which each is configured to pass one of the differentially encoded phase modulated signals from a symbol set with a relative phase difference of approximately 360i/M degrees, where integer i=1 to M.

7. The apparatus of claim 5 further including a controller configured to cause the detector to detect outputs from an M-ary differential phase shift keying demodulation (M-DPSK) of at least a subset of M filters, based on the symbol set, where M is a positive integer.

8. The apparatus of claim 1 wherein the first and second filters are grating-based.

9. The apparatus of claim 8 wherein the first filter is configured to pass the first portion of the differentially encoded phase modulated signal with a relative phase difference of approximately 0 degrees.

10. The apparatus of claim 8 wherein the second filter is configured to pass the second portion of the differentially encoded phase modulated signal with a relative phase difference of approximately 180 degrees.

11. The apparatus of claim 1 wherein impulse responses of the first and second filters are matched to the differentially encoded phase modulated symbols.

12. The apparatus of claim 1 wherein the first filter further comprises:
    multiple filtering paths configured to supply a differential delay between at least two filtering paths; and
    the multiple filtering paths further configured to combine filtered signals on the at least one filtering path with at least one other filtering path, wherein the at least one filtering path and the at least one other filtering path, cause a predetermined degree phase difference between an optical signal directed onto each at least one filtering path, the predetermined degree phase difference substantially corresponding to the differential phase of one DPSK symbol.

13. The apparatus of claim 12 wherein the second filter further comprises:
    multiple filtering paths configured to supply a differential delay between modulated signals on at least two filtering paths; and
    the multiple filtering paths further configured to combine the at least one filtering path with at least one other filtering path, wherein the at least one filtering path and the at least one other filtering path, cause a predetermined degree phase difference between an optical signal directed onto each at least one filtering path, the predetermined degree phase difference substantially corresponding to the differential phase of one DPSK symbol different from that of the first filter.

14. The apparatus of claim 1 wherein the first and second filters are arrayed waveguide gratings (AWGs).

15. The apparatus of claim 14 wherein the first filter further comprises:
    a splitting region configured to split the first portion of the modulated signal into a first plurality of modulated signals;
    multiple signal paths, each optical path configured to supply a respective delay to each of the signals of the first plurality of modulated signals; and
    a demultiplexing region configured to interfere and demultiplex the first plurality of modulated signals.

16. The apparatus of claim 15 wherein the second filter further comprises:
    a splitting region configured to split the second portion of the modulated signal into a second plurality of modulated signals;
    multiple signal paths, each optical path configured to supply a respective delay to each of the signals of the second plurality of modulated signals; and
    a demultiplexing region configured to interfere and demultiplex the second plurality of modulated signals.

17. A method for demodulating a differentially phase encoded modulated signal, comprising:
    demodulating and filtering a first portion of the modulated signal with a first filter to produce a first output; and
    demodulating and filtering a second portion of modulated signal with a second filter to produce a second output, where the first and second outputs represent at least two differential phase encoded symbols of a symbol set available to be interpreted into data.

18. The method of claim 17 wherein the symbol set is a multidimensional alphabet including symbols based on differentially encoded phase, color, wave shape, or any combination thereof.

19. The method of claim 17 further including tuning the first and second filters to a phase of interest of an incoming wavelength.

20. The method of claim 19 further including dynamically tuning the first and second filters.

21. The method of claim 17 wherein the first and second filters include a plurality of filters, further including producing respective outputs of the plurality of filters, and selectively detecting the respective outputs.

22. The method of claim 21 further including selecting at least a subset of M filters of the plurality of filters, and detecting respective outputs from an M-ary differential phase shift keying demodulation (M-DPSK) of the M filters, based on the symbol set, where M is a positive integer.

23. The method of claim 17 further including passing at least one differentially encoded phase modulated signal from a symbol set with a relative phase difference of approximately 360i/M degrees, where integer i=1 to M, with a filter of a set of M filters.

24. The method of claim 17 wherein the filtering includes using a grating.

25. The method of claim 17 wherein demodulating and filtering the first portion of the modulated signal further includes passing the first portion of the modulated signal where two consecutive symbols are substantially in phase.

26. The method of claim 17 wherein demodulating and filtering the second portion of the modulated signal further includes passing the second portion of the modulated signal where two consecutive symbols are substantially out-of-phase.

27. The method of claim 17 further including substantially matching an impulse response of the filtering to a shape of an incoming differential phase encoded symbol.

28. The method of claim 17 further including:
providing multiple signal paths associated with the first filter;
supplying a differential delay between at least two signal paths; and
combining modulated signals on the at least two signal paths.

29. The method of claim 28 further including:
providing multiple signal paths with the second filter;
supplying a differential delay between modulated signals on at least two signal paths; and
combining modulated signals on the at least one signal path, wherein at least one signal path and the at least one other signal path of the at least two signal paths cause a predetermined degree phase difference between a modulated signal directed onto each path.

30. The method of claim 17 wherein the first and second filters are arrayed waveguide gratings (AWGs).

31. The method of claim 30 further including:
splitting the first portion of the modulated signal into a first plurality of modulated signals within the first filter;
supplying a respective delay to each of the signals of the first plurality of modulated signals; and
interfering and demultiplexing the first plurality of modulated signals.

32. The method of claim 31 further including:
splitting the second portion of the modulated signal into a second plurality of modulated signals within the second filter;
supplying a respective delay to each of the signals of the second plurality of modulated signals; and
interfering and demultiplexing the second plurality of modulated signals.

33. An apparatus for demodulating a differentially encoded phase modulated signal, comprising:
a first filter configured to perform, simultaneously, differential demodulation, filtering, and demultiplexing of a first portion of the modulated signal to produce a first output; and
at least one second filter configured to perform, simultaneously, differential demodulation, filtering, and demultiplexing of at least one second portion of the modulated signal to produce at least one second output, the first and at least one second outputs representing at least two phase encoded symbols of a symbol set available to be interpreted into data.

34. The apparatus of claim 33 wherein the first and the at least one second filters are arrayed waveguide gratings (AWG).

35. A method for demodulating a differentially phase encoded modulated signal, comprising:
simultaneously performing differential demodulation, filtering, and demultiplexing of a first portion of the modulated signal to produce a first output; and
simultaneously performing differential demodulation, filtering, and demultiplexing of at least one second portion of the modulated signal to produce at least one second output, the first and at least one second outputs representing at least two phase encoded symbols of a symbol set available to be interpreted into data.

36. The method of claim 35 wherein the simultaneously performing differential demodulation, filter, and demultiplexing for the first and least one second portions of the modulated signal are done with first and least one second filters, respectively.

37. The method of claim 36 wherein the first and least one second filters are arrayed waveguide gratings (AWG).

38. An apparatus for demodulating a differentially encoded phase modulated signals, comprising:
a plurality of arrayed waveguide grating (AWG) based filters, each filter configured to perform differential demodulation, filtering, and wavelength demultiplexing of a respective portion of the modulated signal to produce respective outputs;
a controller configured to select at least a subset of M filters; and
a detector configured to read respective outputs of the M filters to provide at least two phase encoded symbols based on a M-ary differential phase shift keying, where M is a positive integer.

39. An optical demodulator comprising:
at least one first differentially decoding filter; and
at least one second differentially decoding filter, the at least one first and second filters configured to decode at least two phase encoded symbols.

40. The demodulator of claim 39 wherein the first and second filters are further configured to decode symbols of at least one color.

* * * * *

UNITED STATES PATENT AND TRADEMARK OFFICE
CERTIFICATE OF CORRECTION

PATENT NO.         : 8,503,889 B2
APPLICATION NO.    : 12/532560
DATED              : August 6, 2013
INVENTOR(S)        : David O. Caplan and Mark L. Stevens Page 1 of 1

It is certified that error appears in the above-identified patent and that said Letters Patent is hereby corrected as shown below:

In the Specification

In Column 1, at line 11, please add the following paragraph:

GOVERNMENT SUPPORT
    This invention was made with government support under Contract No. FA8721-05-C-0002 awarded by the U.S. Air Force. The government has certain rights in the invention.

Signed and Sealed this
Twelfth Day of November, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,503,889 B2 Page 1 of 1
APPLICATION NO. : 12/532560
DATED : August 6, 2013
INVENTOR(S) : Caplan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 933 days.

Signed and Sealed this
Fifteenth Day of September, 2015

Michelle K. Lee
*Director of the United States Patent and Trademark Office*